(12) United States Patent
Aoyama et al.

(10) Patent No.: US 10,354,506 B2
(45) Date of Patent: Jul. 16, 2019

(54) MANAGEMENT SYSTEM, SERVER, MANAGEMENT DEVICE, AND MANAGEMENT METHOD

(71) Applicant: Hiroshi Aoyama, Akashi-shi, Hyogo (JP)

(72) Inventors: Hiroshi Aoyama, Akashi (JP); Hirokazu Aji, Akashi (JP)

(73) Assignee: Hiroshi Aoyama, Akashi-Shi, Hyogo (JP)

( * ) Notice: Subject to any disclaimer, the term of this patent is extended or adjusted under 35 U.S.C. 154(b) by 0 days.

(21) Appl. No.: 15/552,445

(22) PCT Filed: Feb. 23, 2016

(86) PCT No.: PCT/JP2016/055272
§ 371 (c)(1),
(2) Date: Aug. 21, 2017

(87) PCT Pub. No.: WO2016/136748
PCT Pub. Date: Sep. 1, 2016

(65) Prior Publication Data
US 2018/0047270 A1 Feb. 15, 2018

(30) Foreign Application Priority Data
Feb. 24, 2015 (JP) .................. 2015-034434

(51) Int. Cl.
*G08B 25/04* (2006.01)
*G08B 13/24* (2006.01)
(Continued)

(52) U.S. Cl.
CPC ......... *G08B 13/2462* (2013.01); *G06F 16/50* (2019.01); *G06F 16/5866* (2019.01);
(Continued)

(58) Field of Classification Search
CPC .................. G08B 13/2462; G08B 8/2462
(Continued)

(56) References Cited

U.S. PATENT DOCUMENTS 8,452,102 B2 * 5/2013 Yamakawa ....... G06F 17/30256
348/154
2005/0169367 A1 8/2005 Venetianer et al.
(Continued)

FOREIGN PATENT DOCUMENTS

JP 2004312511 A 11/2004
JP 2008078954 A 4/2008
(Continued)

OTHER PUBLICATIONS

International Search Report dated Mar. 29, 2016 for PCT/JP2016/055272 and English translation.
(Continued)

*Primary Examiner* — Qutbuddin Ghulamali
(74) *Attorney, Agent, or Firm* — Lucas & Mercanti, LLP

(57) ABSTRACT

Provided is a management system in which required capacity of a storage device can be reduced even when the number of events that occur increases and in which the required capacity can be clearly understood. A management system 100 includes: an information storage member 110 that stores individual identification information I of a management target 200; an information reading device 120 that reads individual identification information I from the information storage member 110 located within a predetermined distance from the information reading device 120; an imaging device 130 that generates continuous image data V by continuously capturing images of at least an area where the information reading device 120 can read the individual identification information I from the information storage member 110; a storage device 140 that stores the continuous image data V;
(Continued)

a control device 150 that acquires an event occurrence time at which an event related to the individual identification information I read by the information reading device 120 has occurred, and sets in the continuous image data V a playback start time corresponding to the event occurrence time; and a display device 160 capable of displaying an image G based on the continuous image data V.

14 Claims, 20 Drawing Sheets

(51) Int. Cl.
    *G06F 16/50*     (2019.01)
    *G06F 16/58*     (2019.01)
    *G06Q 10/08*     (2012.01)
    *G11B 20/10*     (2006.01)
    *H04N 5/91*     (2006.01)
    *H04N 5/915*     (2006.01)
    *H04N 7/18*     (2006.01)
    *G11B 27/10*     (2006.01)
    *G11B 27/28*     (2006.01)

(52) U.S. Cl.
    CPC ........... *G06Q 10/08* (2013.01); *G06Q 10/087* (2013.01); *G08B 25/04* (2013.01); *G11B 20/10* (2013.01); *G11B 27/102* (2013.01); *G11B 27/28* (2013.01); *H04N 5/91* (2013.01); *H04N 5/915* (2013.01); *H04N 7/18* (2013.01); *G06T 2207/10016* (2013.01)

(58) Field of Classification Search
    USPC ....................................................... 340/568.1
    See application file for complete search history.

(56) References Cited

U.S. PATENT DOCUMENTS

| | | | |
|---|---|---|---|
| 2006/0001537 A1 | 1/2006 | Blake et al. | |
| 2007/0274563 A1* | 11/2007 | Jung | H04N 1/00352 |
| | | | 382/103 |
| 2008/0304706 A1* | 12/2008 | Akisada | G06K 9/00771 |
| | | | 382/103 |
| 2009/0009601 A1* | 1/2009 | Li | G06Q 10/087 |
| | | | 348/143 |
| 2012/0147192 A1 | 6/2012 | Wright | |

FOREIGN PATENT DOCUMENTS

| | | |
|---|---|---|
| JP | 2008306604 A | 12/2008 |
| JP | 2009093558 A | 4/2009 |
| JP | 2009531748 A | 9/2009 |
| JP | 2013134644 A | 7/2013 |
| WO | 2004/034347 A1 | 4/2004 |

OTHER PUBLICATIONS

Extended European Search Report dated Feb. 28, 2018 from the corresponding European Application No. EP 16755492.2.

* cited by examiner

MANAGEMENT SYSTEM, SERVER, MANAGEMENT DEVICE, AND MANAGEMENT METHOD

CROSS REFERENCE TO RELATED APPLICATION

This Application is a 371 of PCT/JP2016/055272 filed on Feb. 23, 2016, which, in turn, claimed the priority of Japanese Patent Application No. 2015-034434 filed on Feb. 24, 2015, both applications are incorporated herein by reference.

TECHNICAL FIELD

The present invention relates to a management system, a server, a management device, and a management method that combine an event occurrence time at which an event related to individual identification information occurs and continuous image data.

BACKGROUND ART

Conventionally, a system is known in which an event related to individual identification information and image data are combined. For example, in an entrance and exit management system disclosed in Patent Literature 1, after an entry time of an employee is estimated, a video for a fixed time period starting from the estimated entry time is copied from video data, and the copied video data and the individual identification information of the employee are associated with each other and are recorded in a database.

In an image tracking inquiry system related to distribution of an article having an electronic tag photographing function, disclosed in Patent Literature 2, coding is performed for forming an integrated video image by integrating information included in an electronic tag and video record, and then the integrated video image is decoded as necessary. Thus, an original image having the electronic tag information is restored and is played back.

CITATIONS LIST

Patent Literature 1: JP 2009-93558 A
Patent Literature 2: JP 2009-531748 T

SUMMARY OF INVENTION

Technical Problems

However, according to the techniques disclosed in Patent Literatures 1 and 2, as the number of pieces of individual identification information and the number of times that events related to individual identification information occur increase, the number of pieces of fragmented image data also increases accordingly. Therefore, there is a problem that the required capacity of a storage device for storing the image data increases along with an increase in the number of events. This also induces a problem that when the number of events cannot be predicted, the capacity of the storage device required for the system is unknown.

The present invention has been made in order to solve such problems. An object of the present invention is to provide a management system, a server, a management device, and a management method in which required capacity of a storage device can be reduced even when the number of events that occur increases and in which the required capacity can be clearly understood.

Solution to Problems

According to an aspect of the present invention, there is provided a management system including: an information storage member that stores individual identification information of a management target; an information reading device that reads the individual identification information from the information storage member located within a predetermined distance from the information reading device; an imaging device that generates continuous image data by continuously capturing images of at least an area where the information reading device can read the individual identification information from the information storage member; a storage device that stores the continuous image data; a control device that acquires an event occurrence time at which an event related to the individual identification information read by the information reading device has occurred, and sets in the continuous image data a playback start time corresponding to the event occurrence time; and a display device capable of displaying an image based on the continuous image data.

Preferably, the control device causes the display device to display a playback start key corresponding to the event, accepts selection of the playback start key, and causes the display device to play back the image based on the continuous image from the playback start time corresponding to the selected playback start key.

Preferably, the imaging device includes a plurality of cameras, and a plurality of pieces of the continuous image data captured by the plurality of cameras are stored in the storage device.

Preferably, based on the individual identification information, the control device causes the storage device to store at least one of a number of information storage members, a type of information storage members, a time at which the information reading device first reads the individual identification information, and a time at which the information reading device reads the individual identification information last time.

Preferably, the event includes a case where the information reading device reads specific individual identification information.

Preferably, the event includes a case where the information reading device that has read specific individual identification information can no longer read the individual identification information which is identical to the specific individual identification information.

Preferably, the information storage member is attached to the management target managed in a management area, the management area includes a management location set in the management area and a gateway through which the management target carried into and out of the management area passes, and the imaging device continuously captures images of the management area and the gateway.

Preferably, the information reading device includes: a first information reading unit that reads the individual identification information from the information storage member located at the management location; and a second information reading unit that reads the individual identification information from the information storage member located at the gateway, and the event includes a case where, after each of the first information reading unit and the second information reading unit reads specific individual identification information, each of the first information reading unit and the second information reading unit no longer reads the specific individual identification information for a predetermined time period or longer.

Preferably, the gateway includes an entrance through which the management target carried into the management area passes, and an exit through which the management target carried out of the management area passes, the exit being provided separately from the entrance, and the entrance and the exit are individually provided with the information reading device.

Preferably, the gateway includes a first gateway through which the management target carried into and out of the management area passes, and a second gateway through which the management target carried into and out of the management area passes, the second gateway being provided separately from the first gateway, and the first gateway and the second gateway are individually provided with the information reading device.

Preferably, the information storage member is an RFID tag and the information reading device is an RFID reader.

According to another aspect of the present invention, there is provided a server including a storage device that stores: continuous image data obtained by continuously capturing images of at least an area where an information reading device can read individual identification information of a management target stored in an information storage member; and an event occurrence time at which an event related to the individual identification information has occurred, wherein a playback start time corresponding to the event occurrence time is set in the continuous image data.

According to yet another aspect of the present invention, there is provided a server including a storage device that stores continuous image data obtained by continuously capturing images of at least an area where an information reading device can read individual identification information of a management target stored in an information storage member; and a control device that acquires an event occurrence time at which an event related to the individual identification information has occurred, and sets in the continuous image data a playback start time corresponding to the event occurrence time.

According to yet another aspect of the present invention, there is provided a management device including a display device that displays an image based on continuous image data obtained by continuously capturing images of at least an area where an information reading device can read individual identification information of a management target stored in an information storage member and in which a playback start time is set, the playback start time corresponding to an event occurrence time at which an event related to the individual identification information has occurred.

According to yet another aspect of the present invention, there is provided a management device including a display device; and a control device that causes the display device to display an image based on continuous image data obtained by continuously capturing images of at least an area where an information reading device can read individual identification information of a management target stored in an information storage member and in which a playback start time is set, the playback start time corresponding to an event occurrence time at which an event related to the individual identification information has occurred.

According to yet another aspect of the present invention, there is provided a management method including: storing, in a storage device, continuous image data obtained by continuously capturing images of at least an area where an information reading device can read individual identification information of a management target stored in an information storage member; acquiring an event occurrence time at which an event related to the individual identification information has occurred; and setting, in the continuous image data, a playback start time corresponding to the event occurrence time.

According to yet another aspect of the present invention, there is provided a management method including causing a display device to display an image based on continuous image data obtained by continuously capturing images of at least an area where an information reading device can read individual identification information of a management target stored in an information storage member and in which a playback start time is set, the playback start time corresponding to an event occurrence time at which an event related to the individual identification information has occurred.

Advantageous Effects of Invention

As described above, according to the present invention, there can be provided a management system, a server, a management device, and a management method in which required capacity of a storage device can be reduced even when the number of events that occur increases and in which the required capacity can be clearly understood.

DESCRIPTION OF EMBODIMENTS

Regarding reference signs, in a case where a plurality of constituents having an identical structure are used in the following description, each constituent is denoted by an alphabetical letter without a branch number in an Arabic numeral when each constituent is described as a superordinate concept. In a case where respective constituents need to be distinguished from each other (that is, in a case where the constituents are described as subordinate concepts), the constituents are distinguished from each other such that the constituents are denoted by identical alphabetical letters followed by branch numbers in Arabic numerals.
(Configuration of Management System 100)

Figure 1:
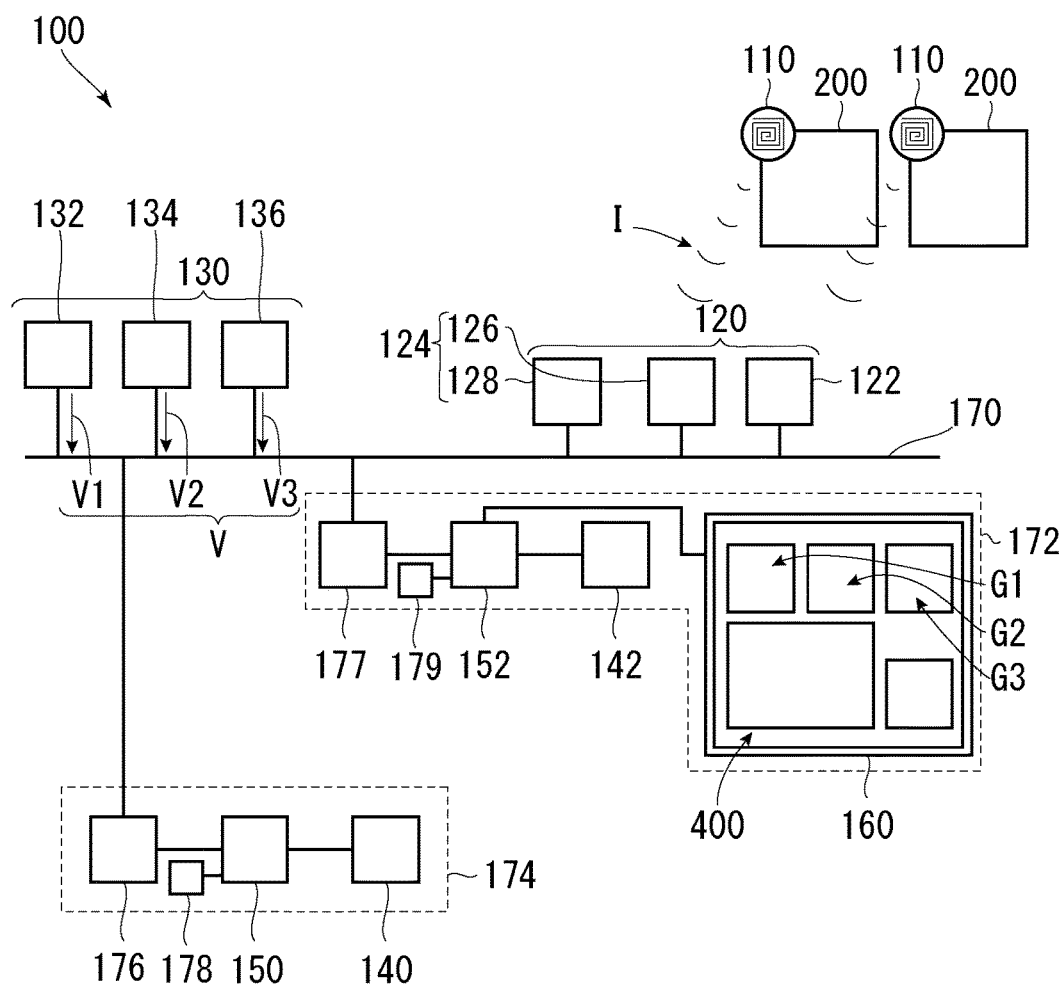
FIG. 1 is a diagram showing an example of a configuration of a management system 100 to which the present invention is applied.

A management system 100 to which the present invention is applied is a system for managing a commodity which is a management target 200. As shown in FIG. 1, the management system 100 generally includes an information storage member 110, an information reading device 120, an imaging device 130, a server 174, a PC (management device) 172, and a network device 170. In addition, the server 174 includes a storage device 140, a control device 150, a communication means 176, and a clock 178. The PC 172 at least includes a PC-side control device 152, a display device 160, and a PC-side communication means 177.

The information storage member 110 is a member which is attached to the management target 200 and used. In the present embodiment, an RFID tag is used as the information storage member 110. For example, the RFID (Radio Frequency Identifier) tag stores specific individual identification information I such as a commodity ID, a manufacture date, a manufacturing factory, or the like, and transmits the specific individual identification information I in a non-contact communication method to an RFID reader (the information reading device 120) located within a predetermined distance from the RFID tag by using an electric field, a radio wave, or the like. (Note that unlike the present embodiment, a plurality of antennas which receive a signal including the individual identification information I may be provided for one RFID reader.) In addition, in the present invention, both a "passive-type" RFID tag and an "active-type" RFID tag, which are two major types of RFID tags, may be used. The passive-type RFID tag reflects some of the radio waves from the RFID reader, puts the individual identification information I on the reflected wave, and sends the individual identification information I to the RFID reader. The "active type" RFID tag includes a built-in battery, uses power from the battery to emit radio waves. In addition, the information storage member 110 is not limited to the RFID tag. Another type of device (including a contact-type device), such as a barcode or a two dimensional code, may be used as long as the device can store the individual identification information I of the management target 200 and allows the information reading device 120 to read the individual identification information I.

The information reading device 120 reads individual identification information I from the information storage member 110 located within a predetermined distance (area) from the information reading device 120. In the present embodiment, as described above, the RFID reader is used as the information reading device 120. The information reading device 120 is connected to the control device 150 or the like via the network device 170. The individual identification information I of the information storage member 110 read by the information reading device 120 is handled by the control device 150 via the network device 170.

The imaging device 130 generates continuous image data V by continuously capturing images of a management area 300, which is an area where the management target 200 is managed.

In the present embodiment, the imaging device 130 is configured by three cameras 132, 134, and 136. Continuous image data V1, V2, and V3 generated by the cameras 132, 134, and 136 are stored in the storage device 140 via the network device 170. Note that in the present embodiment, a known video camera is used as each of the cameras 132, 134, and 136. However, another device such as a smartphone or a web cam may be used as long as the device can generate continuous image data V. Hereinafter, in a case where continuous image data is described as a superordinate concept, the continuous image data is denoted only by the alphabet letter "V" without adding a branch number in an Arabic numeral. In a case where it is necessary to distinguish pieces of image data generated by the plurality of cameras 132, 134, and 136 from one another (that is, in a case where the pieces of image data are described as subordinate concepts), the pieces of image data are denoted by the identical alphabet letters followed by branch numbers in Arabic numerals such as "V1", "V2", and "V3" so that the pieces of image data are distinguished from one another.

As described above, the server 174 includes the storage device 140, the control device 150, the communication means 176, and the clock 178. In the following description, data exchange among the information reading device 120, the imaging device 130, and the PC 172 via the control device 150 and the network device 170 is performed via the communication means 176. Note that at least the information reading device 120 and the imaging device 130 also include a built-in clock (not shown), and these built-in clocks and the clock 178 are preferably synchronized with one another according to a standard time of a country or a region in which the management system 100 is configured. In particular, the clocks are preferably synchronized with one another according to the time based on the built-in clock of the imaging device 130.

The storage device 140 stores the continuous image data V generated by the imaging device 130, a program for operating the control device 150, a time recording table T (see FIG. 5) to be described later, and the like. In addition, the storage device 140 separately stores the continuous image data V1, V2, and V3 generated by the plurality of cameras 132, 134, and 136, respectively. Further, the storage device 140 stores individual identification information I of each information storage member 110 sent from the information reading device 120.

In the case of the present embodiment, the storage device 140 is a hard disk drive serving as a "storage memory" incorporated in the server 174 connected to the network device 170. Note that the storage device 140 is realized by one of various RAMs (Random Access Memories), various ROMs (Read-Only Memories), flash memories, and the like. In addition, the storage device 140 is also realized by a storage medium such as a USB (Universal Serial Bus) (registered trademark) memory, a CD (Compact Disc), a DVD (Digital Versatile Disk), a memory card, a solid state drive, an IC (integrated Circuit) card, an optical card, a mask ROM, an EPROM (Erasable Programmable Read Only Memory), and an EEPROM (Electronically Erasable Programmable Read-Only Memory).

Note that a PC-side storage device 142 disposed in the PC 172 connected to the network device 170 separately from the server 174 may be used as the storage device 140 as necessary. In the present embodiment, the PC 172 also includes the PC-side storage device 142, the PC-side control device 152, the PC-side communication means 177, and a PC-side clock 179.

The control device 150 executes various processes to be described later by executing a program stored in the storage device 140 or an external storage medium. In the case of the present embodiment, the control device 150 is a CPU serving as a "processor" incorporated in the server 174 connected to the network device 170.

As described above, the PC 172 includes the PC-side storage device 142, the PC-side control device 152, the PC-side communication means 177, the PC-side clock 179, and the display device 160. The PC-side storage device 142, the PC-side control device 152, the PC-side communication means 177, and the PC-side clock 179 are similar to the storage device 140, the control device 150, the communication means 176, and the clock 178 incorporated in the server 174, respectively. Therefore, description of the server 174 is applied for description of the above.

The display device 160 plays back and displays images G1, G2, G3 and other images based on the continuous image data V1, V2, and V3 on the management screen 400. In the case of the present embodiment, the display device 160 is a monitor included in the PC 172.

The network device 170 electrically connects at least the information reading device 120, the imaging device 130, the storage device 140, the control device 150, and the display device 160 to one another so as to enable data exchange. For example, examples of the network device 170 include a device that exchanges data through the Internet, a LAN (Local Area Network), wireless communication, optical communication, or the like. In addition, the information reading device 120 and the imaging device 130 may be directly connected to one PC 172 or server 174 through a cable or the like. In this case, the cable or the like serves as the network device 170.

(Application Example of Management System 100)

Next, with reference to FIG. 2, an embodiment will be described in which the above-described management system 100 is applied to a system that manages the management targets 200 such as commodities by setting a warehouse, a room of a building, or the like as the management area 300. The management area 300 according to the present embodiment is generally provided with a management location 302 which is a commodity shelf for storing the management targets 200 such as commodities, and a gateway 304 for carrying in and out the management target 200 to and from the management area 300.

In the case of the present embodiment, the gateway 304 includes an entrance 306 through which the management target 200 carried into the management area 300 passes, and an exit 308 through which the management target 200 carried out of the management area 300 passes. In addition, the information storage member 110 is attached to each commodity which is the management target 200.

In the present embodiment, the information reading device 120 includes a first information reading unit 122 which reads the individual identification information I from the information storage member 110 located at the management location 302, and a second information reading unit 124 which the reads individual identification information I from the information storage member 110 located at the gateway 304. Further, in this embodiment, since the entrance 306 and the exit 308 are separately provided, the second information reading unit 124 is also configured by an entrance-side second information reading unit 126 and an exit-side second information reading unit 128. The entrance-side second information reading unit 126 is provided near the entrance 306, and reads the individual identification information I from the information storage member 110 passing through the entrance 306. The exit-side second information reading unit 128 is provided near the exit 308, and reads the individual identification information I from the information storage member 110 passing through the exit 308.

Further, the three cameras 132, 134, and 136 constituting the imaging device 130 continuously capture images of the entrance 306 (covered by the camera 132), the management location 302 (covered by the camera 134), and the exit 308 (covered by the camera 136), respectively. More specifically, the camera 132 captures an image of an area where the entrance-side second information reading unit 126 can read the individual identification information I. The camera 134 captures an image of an area where the first information reading unit 122 can read the individual identification information I. The camera 136 captures an image of an area where the exit-side second information reading unit 128 can read the individual identification information I.

(Embodiment of Processes Executed by Management System 100)

Next, management processes of the management target 200 using the management system 100 according to the present embodiment will be described.

Figure 3:
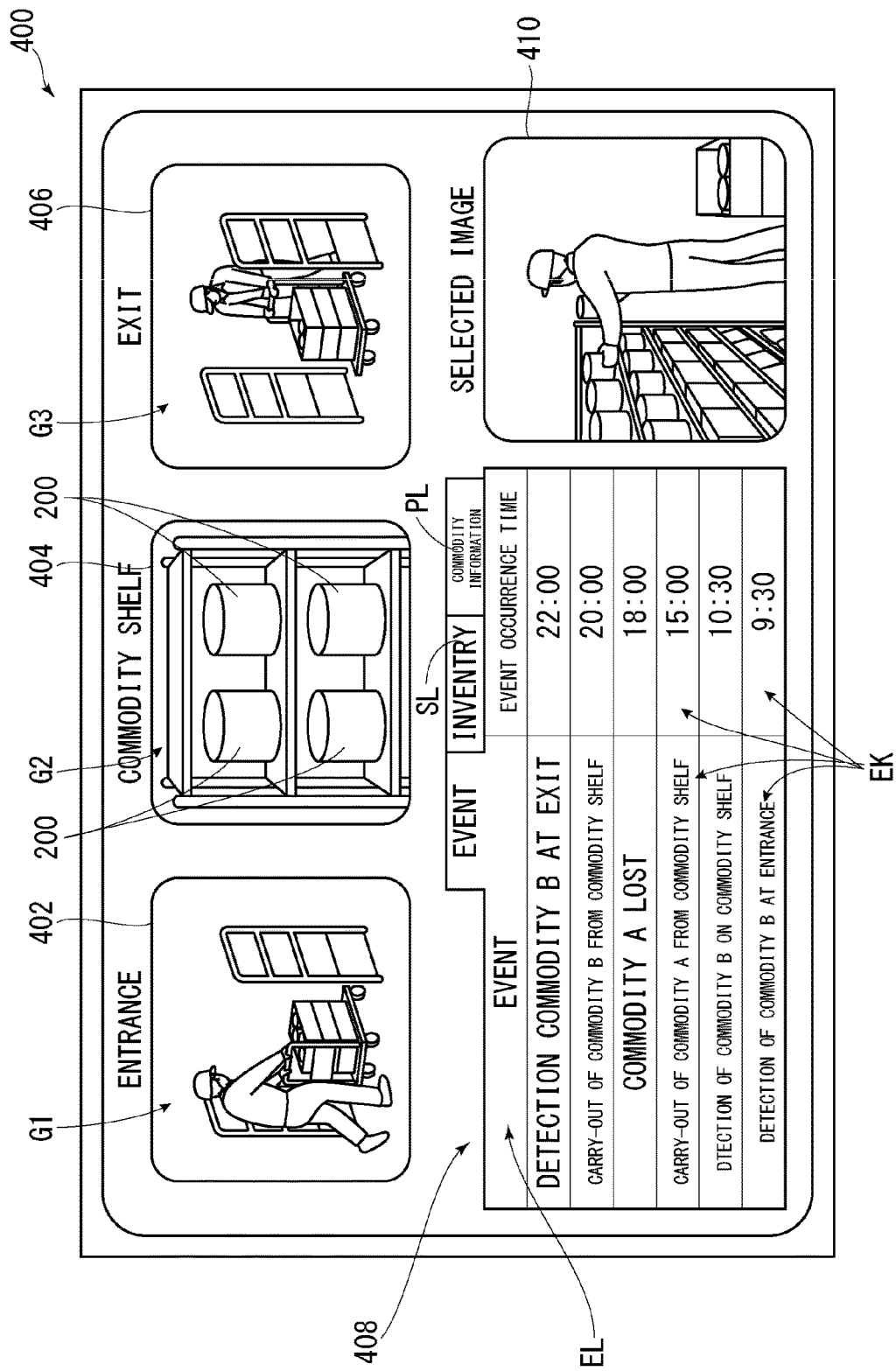
FIG. 3 is a diagram showing an example of a management screen 400.

With reference to FIG. 1 and FIG. 3, in the management system 100, the management screen 400 is displayed on the display device 160. The management screen 400 includes camera image display sections 402, 404, and 406, a list display section 408, and a selected image display section 410. Note that the camera image display sections 402, 404, and 406 are display sections provided as necessary. Further, another element may be added to the management screen 400 as necessary.

On the camera image display sections 402, 404, and 406, images G1, G2, and G3 are displayed. The images G1, G2, and G3 are based on three types of continuous image data V1, V2, and V3 sent from the three cameras 132, 134, 136, respectively. In the present embodiment, the images G1, G2, and G3 continuously captured by the three cameras 132, 134, and 136 are continuously displayed on the camera image display sections 402, 404, and 406 in real time, respectively.

Figure 4:
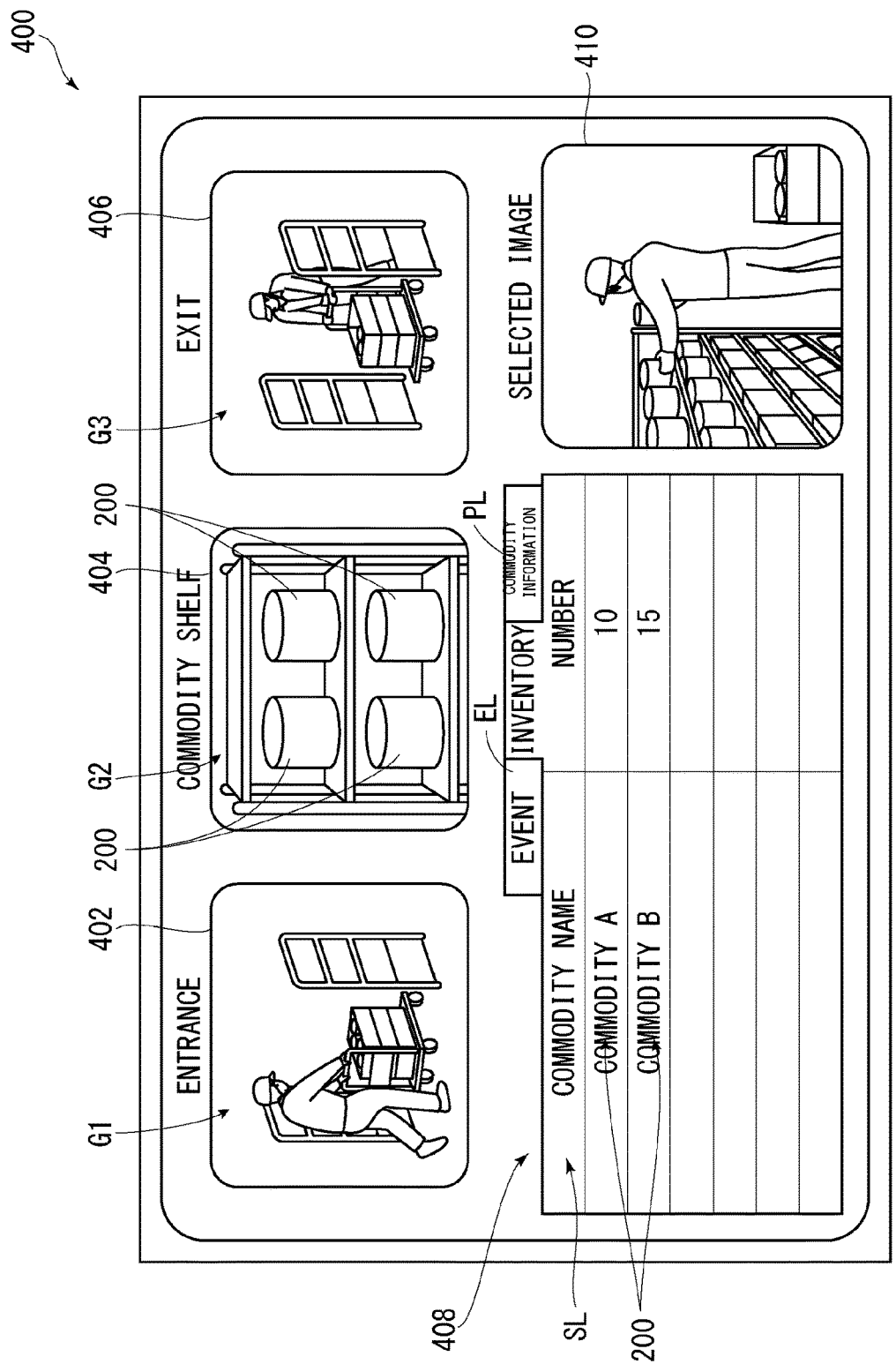
FIG. 4 is a diagram showing an example of the management screen 400.

On the list display section 408, an event list EL, an inventory list SL (see FIG. 4), and a commodity information list PL are displayed. In the event list EL, contents of events (details of the event will be described later) related to the individual identification information I from the information storage member 110 and event times of the events are listed in the order that the events occur. In the inventory list SL, IDs of the management targets 200 (For example, commodity number or commodity name. The same applies below.) and the number of management targets 200 currently stored in the management location 302 are listed. In the commodity information list PL, the IDs of the management targets 200 and the commodity information of the management targets 200 are listed. In addition, when a user selects one of the tabs corresponding to the lists EL, SL, and PL, the displayed list is switched. Note that the inventory list SL and the commodity information list PL are not essential for implementation of the present invention. In addition, another type of list may be added to the list display section 408.

Returning to FIG. 3, when a playback start key EK, which will be described later, is selected, any one of the images G1, G2, and G3 is displayed on the selected image display sections 410 from a playback start time set in the continuous image data V1, V2, and V3. The images G1, G2, and G3 are based on the continuous image data V1, V2, and V3 continuously captured by the cameras 132, 134, and 136, respectively. As will be described later, the playback start time associated with each event is set in each of the continuous image data V1, V2, and V3.

In principle, the playback start time corresponds to the event occurrence time at which the event related to the specific individual identification information I has occurred. In the present embodiment, except for a "lost" event, which will be described later, the time at which the event has occurred is set as the playback start time.

Figure 5:
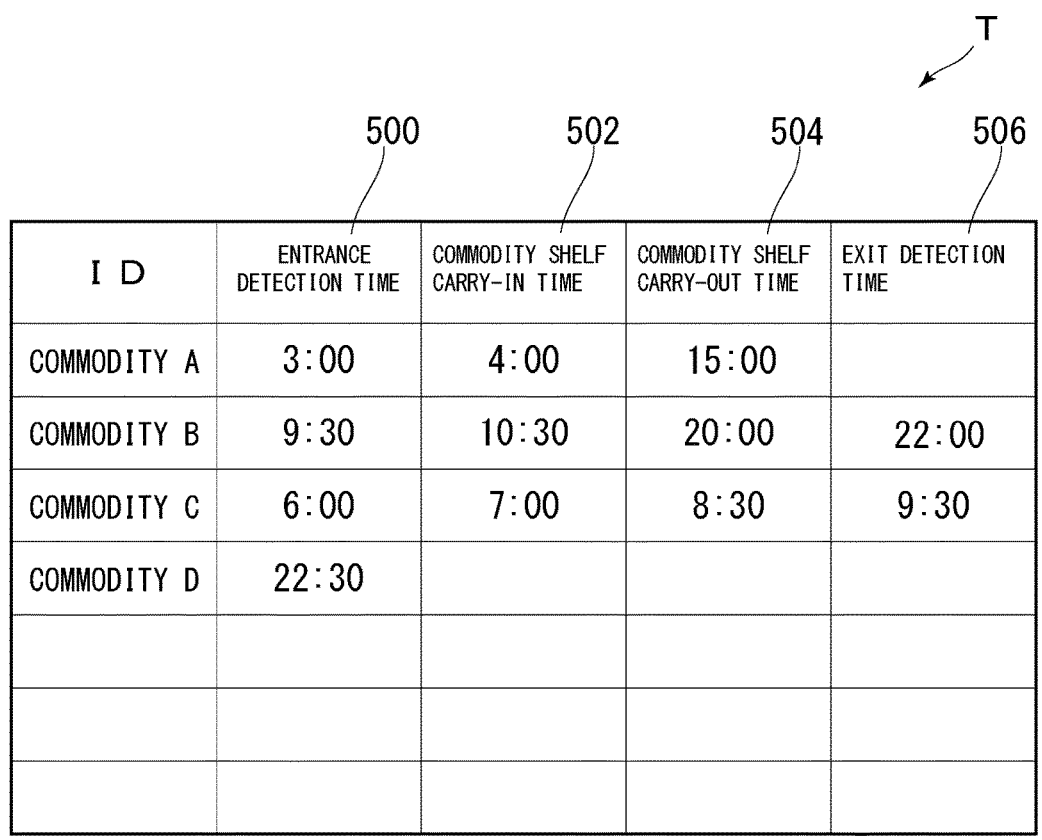
FIG. 5 is a diagram showing an example of a time recording table T.

In addition, in the present management system 100, the time recording table T stored in the storage device 140, as shown in FIG. 5 is used. The time recording table T is provided with fields for recording at least the ID included in the individual identification information I, and an entrance detection time 500, a commodity shelf carry-in time 502, a commodity shelf carry-out time 504, and an exit detection time 506 which correspond to the ID.

The entrance detection time 500 refers to the time at which the information storage member 110 storing the corresponding individual identification information I is detected (the identification information I is read [received]) by the entrance-side second information reading unit 126. The commodity shelf carry-in time 502 refers to the time at which the information storage member 110 storing the corresponding individual identification information I is detected (the individual identification information I is read [received]) by the first information reading unit 122. The commodity shelf carry-out time 504 refers to the time at which the information storage member 110 storing the corresponding individual identification information I can no longer be detected (the individual identification information I can no longer be read [can no longer be received]) by the first information reading unit 122. Furthermore, the exit detection time 506 refers to the time at which the information storage member 110 storing the corresponding individual identification information I is detected (the individual identification information I is read [received]) by the exit-side second information reading unit 128.

(Functional Blocks of Processes Executed by Management System 100)

Figure 6:
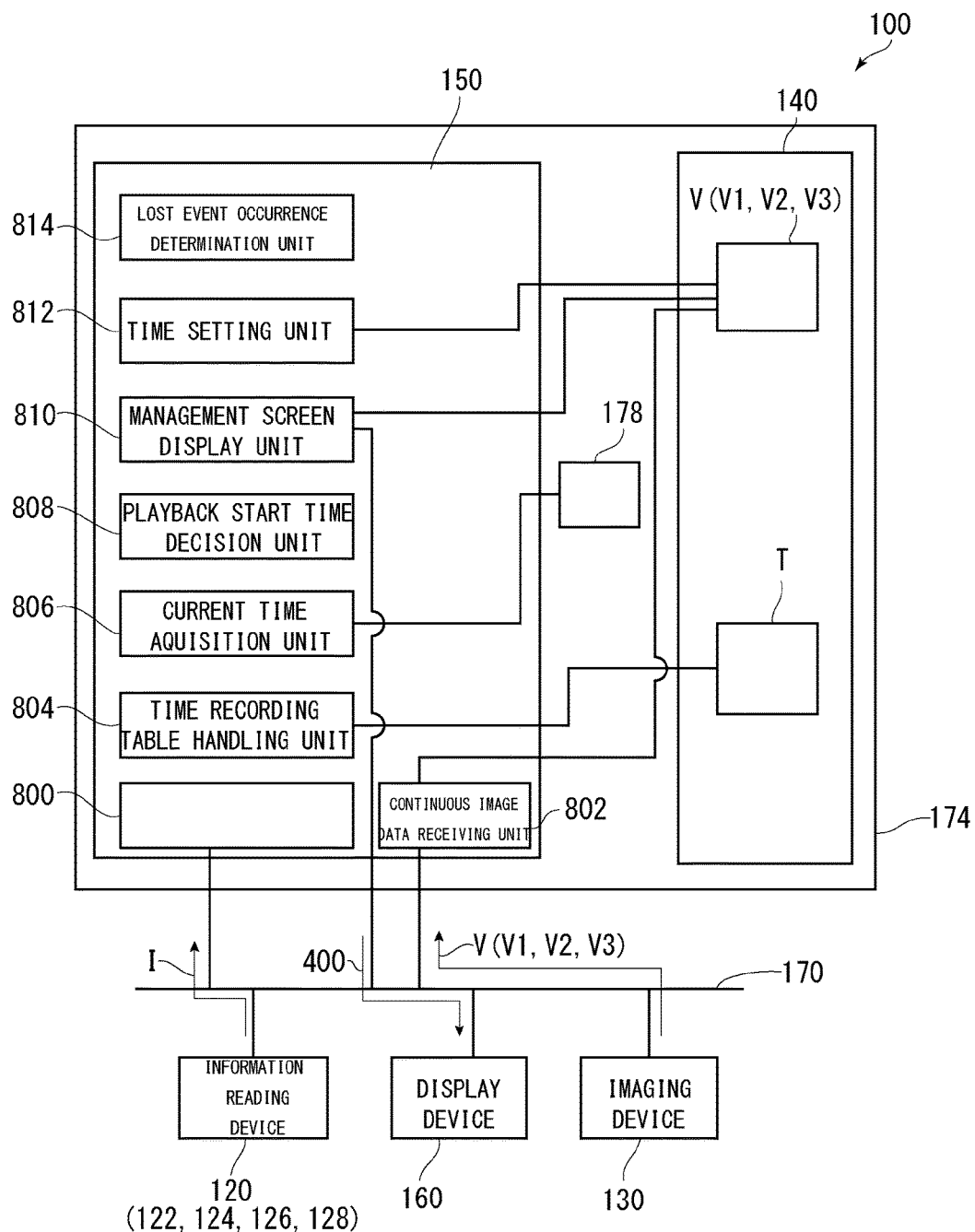
FIG. 6 is a diagram showing an example of functional blocks of processes executed by the management system 100.

FIG. 6 is a diagram showing functional blocks of processes executed by the management system 100 according to the embodiment. The processes executed by the management system 100 are performed by an individual identification information receiving unit 800, a continuous image data receiving unit 802, a time recording table handling unit 804, a current time acquisition unit 806, a playback start time decision unit 808, a management screen display unit 810, a time setting unit 812, and a lost event occurrence determination unit 814. The control device 150 executes steps S600 to S784 to be described later, thereby constituting each of the above units.

The individual identification information receiving unit 800 has a function of receiving the individual identification information I from the information reading device 120 via the network device 170.

The continuous image data receiving unit 802 has a function of receiving the continuous image data V from the imaging device 130 via the network device 170 and storing the continuous image data V in the storage device 140.

The time recording table handling unit 804 has a function of reading the content of the time recording table T. In addition, the time recording table handling unit 804 has a function of writing into the time recording table T. The time recording table handling unit 804 writes the entrance detection time, the commodity shelf carry-in time, the commodity shelf carry-out time, and the exit detection time into the time recording table T, for each commodity.

The current time acquisition unit 806 has a function of acquiring from the clock 178 the time (event occurrence time) at which an event has occurred.

The playback start time decision unit 808 has a function of deciding the playback start time based on the event occurrence time. In the present embodiment, when the entrance-side second information reading unit 126 reads the individual identification information I from the information storage member 110, the playback start time decision unit 808 decides the time at which the entrance-side second information reading unit 126 reads the individual identification information I as the playback start time. In the present embodiment, when the exit-side second information reading unit 128 reads the individual identification information I from the information storage member 110, the playback start time decision unit 808 decides the time at which the exit-side second information reading unit 128 reads the individual identification information I as the playback start time. In the present embodiment, when the first information reading unit 122 reads the individual identification information I from the information storage member 110, and thereafter the first information reading unit 122 can no longer read the individual identification information I from the information storage member 110, the playback start time decision unit 808 decides the time at which the first information reading unit 122 reads the individual identification information I and the time at which the first information reading unit 122 can no longer read the individual identification information I as the playback start times. In the present embodiment, when the entrance-side second information reading unit 126 reads the individual identification information I from the information storage member 110 and the first information reading unit 122 reads the individual identification information I from the information storage member 110, and thereafter the first information reading unit 122 can no longer read the individual identification information I from the information storage member 110 and the exit-side second information reading unit 128 can no longer read the individual identification information I from the information storage member 110 for a predetermined time period or longer, the playback start time decision unit 808 decides the time at which the first information reading unit 122 can no longer read the individual identification information I from the information storage member 110 as the playback start time.

The management screen display unit 810 has a function of displaying the generated management screen 400 on the display device 160 of the PC 172 via the network device 170. The management screen display unit 810 transmits the continuous image data V stored in the storage device 140 to the display device 160 and causes the display device 160 to display the continuous image data V at a predetermined location on the display device 160.

The time setting unit 812 has a function of setting an "event" name and "playback start time" in the continuous image data V stored in the storage device 140.

The lost event occurrence determination unit 814 has a function of determining that a "lost" event in which the management target 200 is lost has occurred when a predetermined condition is met. In the present embodiment, the lost event occurrence determination unit 814 determines that a "lost event" has occurred when the entrance-side second information reading unit 126 reads the individual identification information I from the information storage member 110 and the first information reading unit 122 reads the individual identification information I from the information storage member 110, and thereafter the first information reading unit 122 can no longer read the individual identification information I from the information storage member 110 and the exit-side second information reading unit 128 can no longer read the individual identification information I from the information storage member 110 for a predetermined time period or longer.

(Process Flow Executed by Management System 100)

Figure 7:
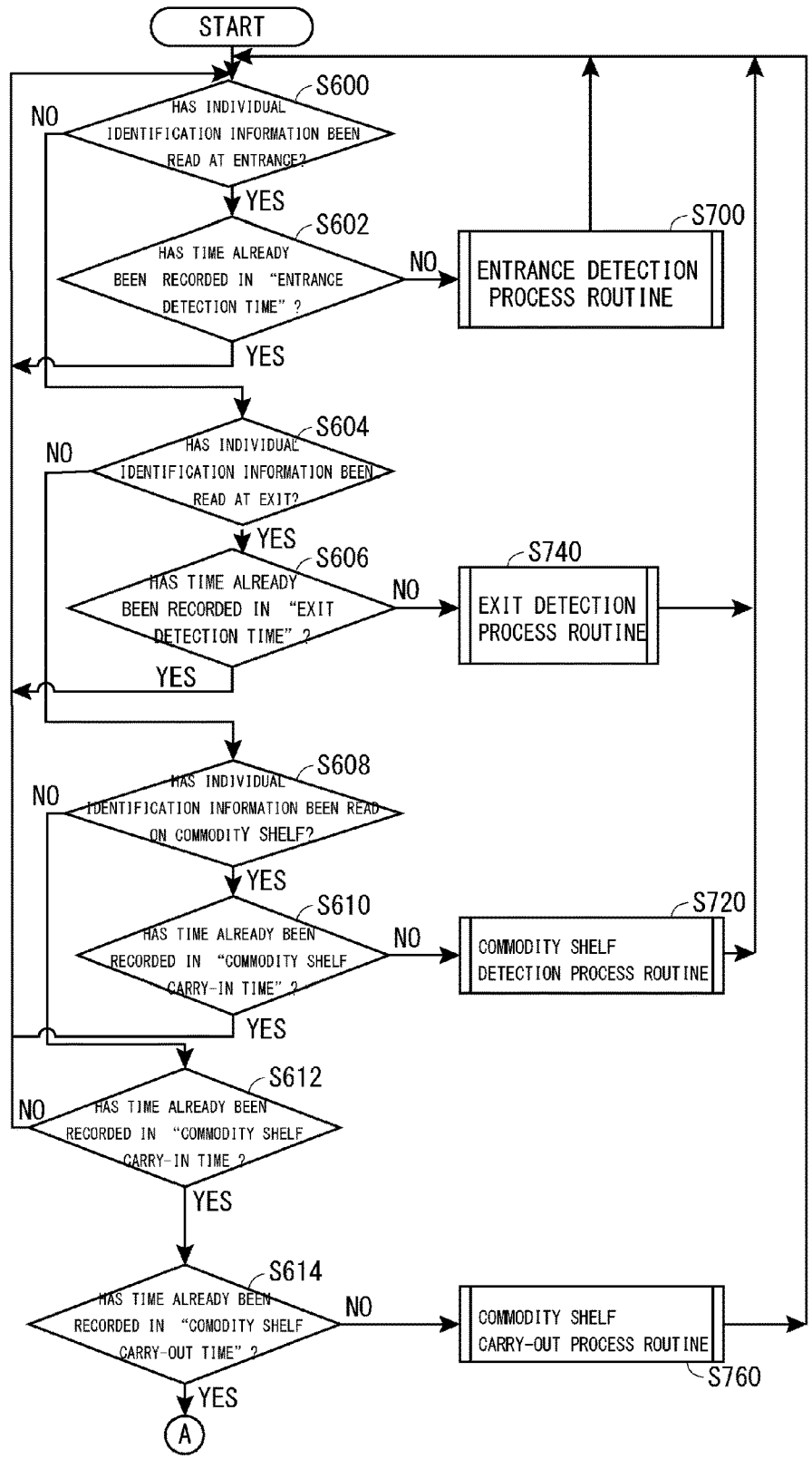
FIG. 7 is a flowchart showing an example of processes executed by the management system 100.
Figure 8:
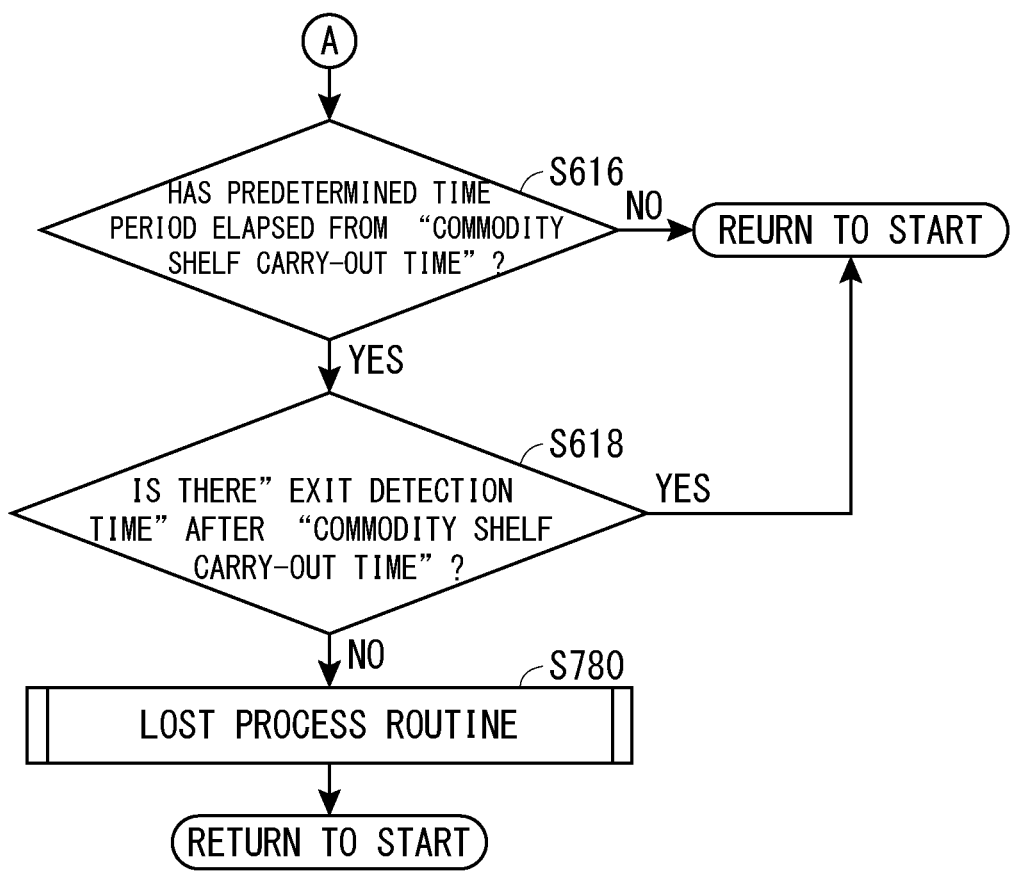
FIG. 8 is a flowchart showing an example of processes executed by the management system 100.
Figure 9:
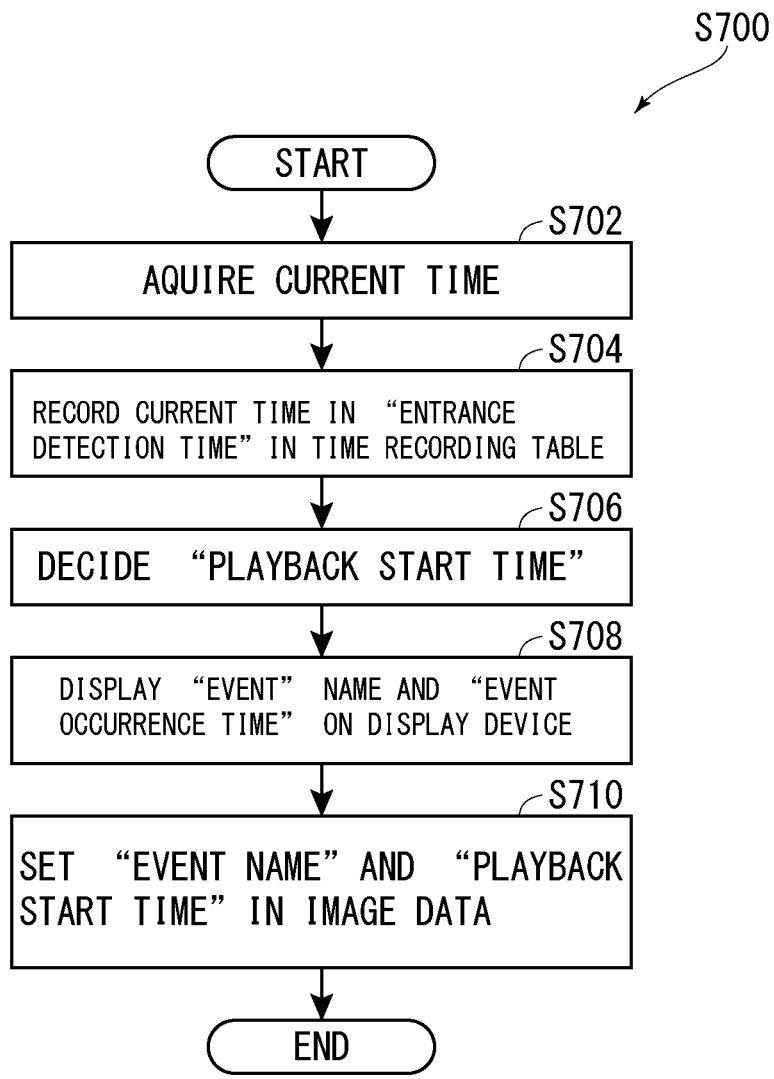
FIG. 9 is a flowchart showing an example of an entrance detection process routine S700.
Figure 10:
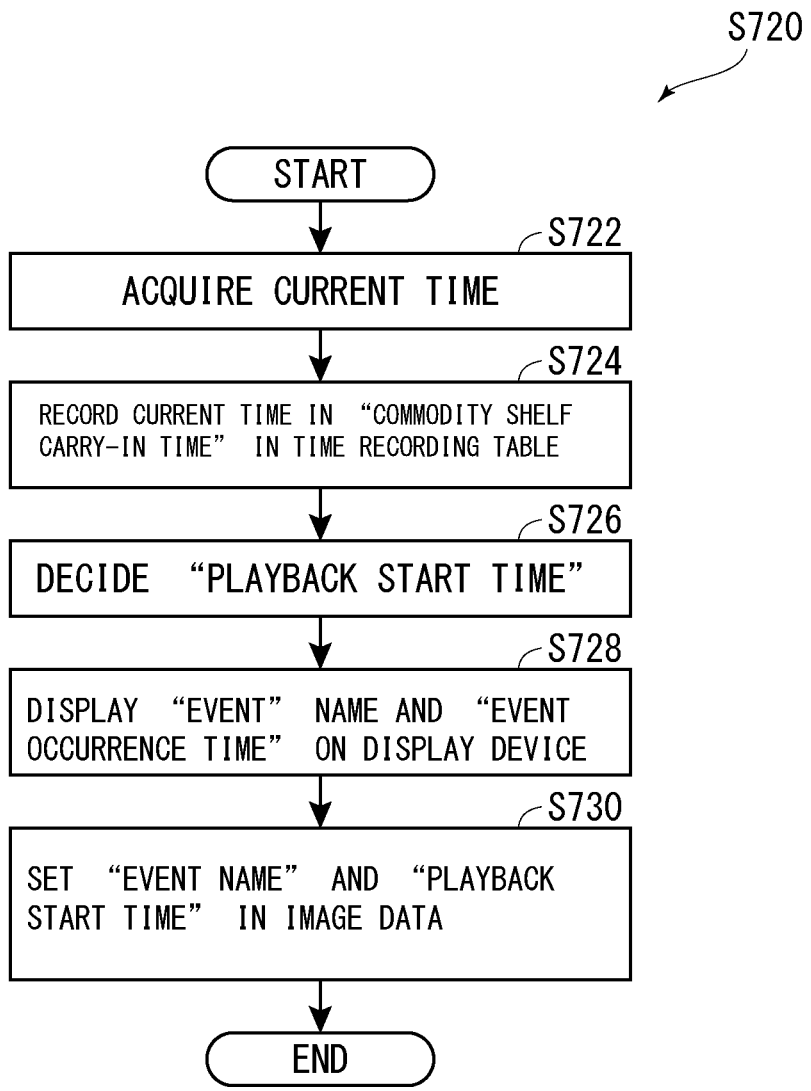
FIG. 10 is a flowchart showing an example of commodity shelf detection process routine S720.
Figure 11:
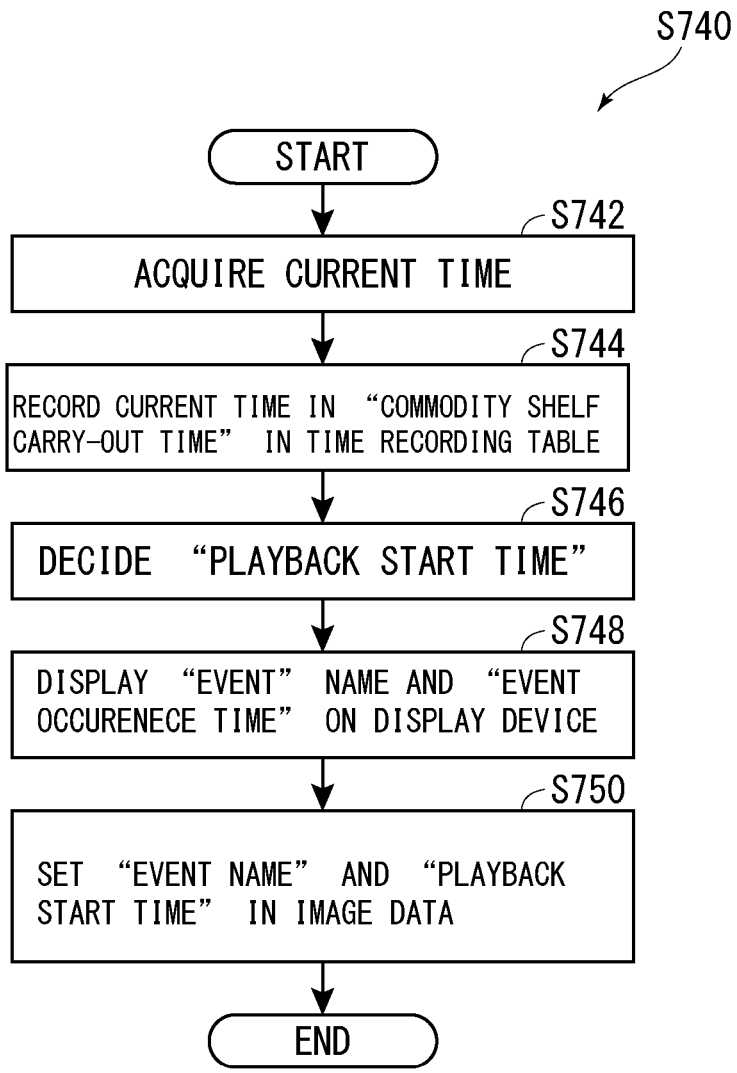
FIG. 11 is a flowchart showing an example of exit detection process routine S740.
Figure 12:
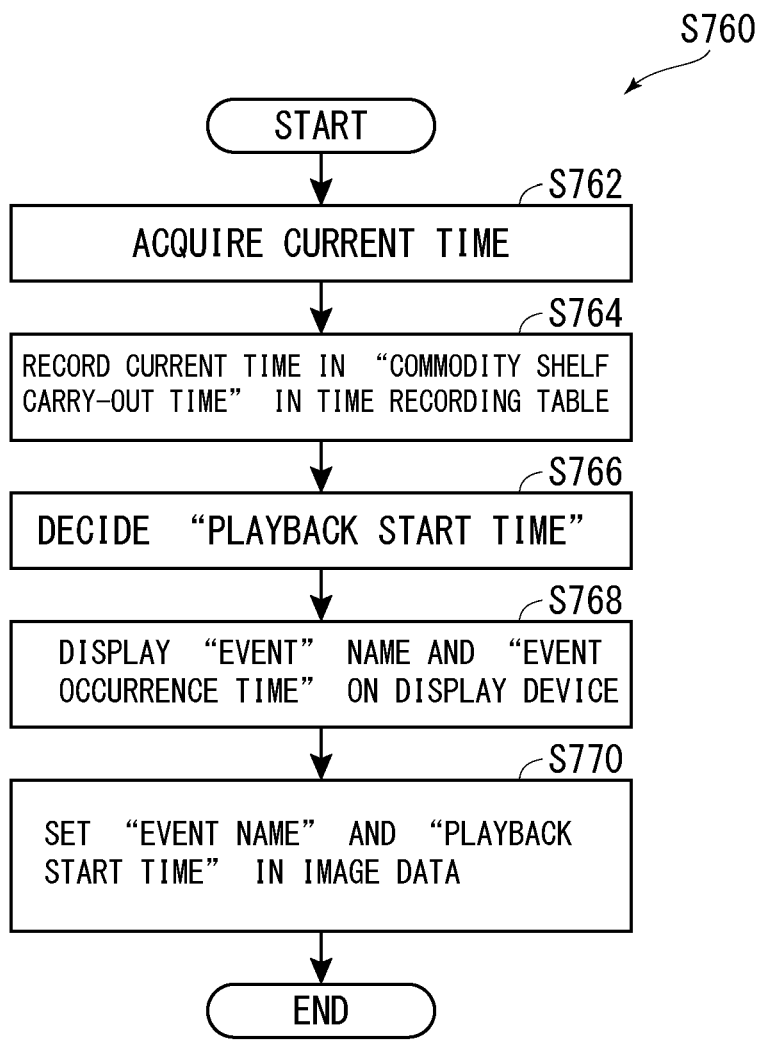
FIG. 12 is a flowchart showing an example of commodity shelf carry-out process routine S760.
Figure 13:
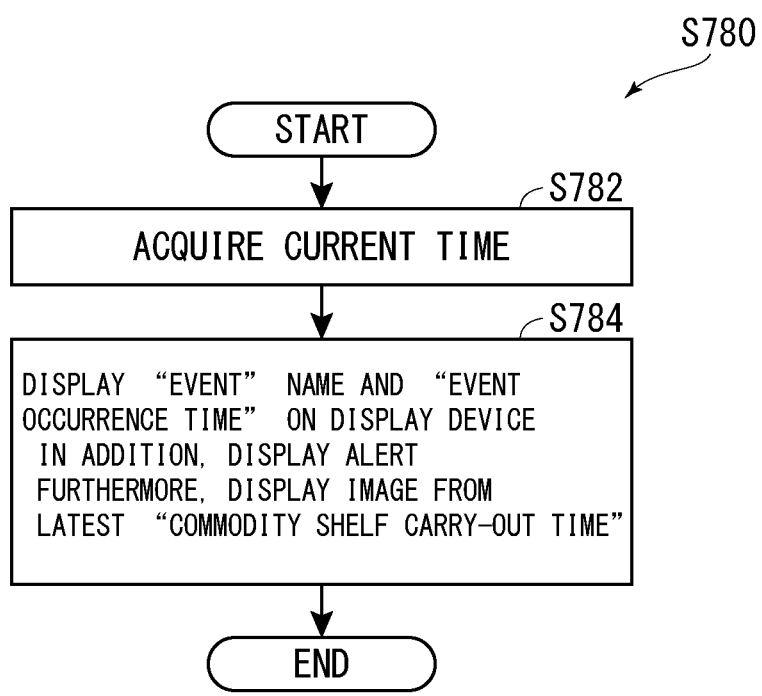
FIG. 13 is a flowchart showing an example of lost process routine S780.

Next, a flow of processes executed by the management system 100 will be described. FIGS. 7 to 13 are flowcharts of processes executed by the present management system 100. Specifically, FIGS. 7 and 8 are flowcharts showing processes executed by the management system 100. FIG. 9 shows a process routine when the individual identification information I is read (detected) at the entrance 306. FIG. 10 shows a process routine when the individual identification information I is read at the management location 302 (commodity shelf). FIG. 11 shows a process routine when the individual identification information I is read at the exit 308. FIG. 12 shows a process routine when the individual identification information I that has been read at the management location 302 (commodity shelf) is no longer read. FIG. 13 shows a process routine when a commodity is in a "lost" state.

Returning to FIG. 1, when the control device 150 in the server 174 starts to execute the program stored in the storage device 140, the management system 100 is started. As a premise, the control device 150 receives via the network device 170 the continuous image data V1, V2, and V3 each generated by the imaging device 130 continuously capturing images of at least the area where the information reading device 120 can read the individual identification information I from the information storage member 110 in the management area 300, and causes the storage device 140 to continuously store the continuous image data V1, V2, and V3. The control device 150 operates in this way, thereby constituting the continuous image data receiving unit 802 (see FIG. 6).

First, as shown in FIG. 7, the control device 150 determines whether or not the entrance-side second information reading unit 126 provided near the entrance 306 has read the individual identification information I from the information storage member 110 (S600). Specifically, the control device 150 determines whether or not the individual identification information I has been sent to the control device 150 from the entrance-side second information reading unit 126 via the network device 170 and the communication means 176 of the PC 172. The control device 150 executes the process in S600, thereby constituting part of the individual identification information receiving unit 800 (see FIG. 6).

When the individual identification information I is read (when the determination is YES in S600), the control device 150 reads the time recording table T from the storage device 140 and checks the row corresponding to the ID included in the read individual identification information I, and determines whether or not time has already been recorded in the field of the entrance detection time 500 (S602). The control device 150 executes the process in S602, thereby constituting part of the time recording table handling unit 804 (see FIG. 6).

If the time has already been recorded in the field of the entrance detection time 500 (when the determination is YES in S602), the control device 150 again determines whether or not the entrance-side second information reading unit 126 provided near the entrance 306 has read the individual identification information I from the information storage member 110 (S600).

In contrast, if the time is not yet recorded in the field of the entrance detection time 500 (when the determination is NO in step S602), the control device 150 determines that an event "detection of commodity at entrance" has occurred based on the fact that the entrance-side second information reading unit 126 has read the individual identification information I, and executes an entrance detection process routine (S700). As shown in FIG. 9, in the entrance detection processing routine (S700), the control device 150 first acquires the current time as the event occurrence time from the clock 178 provided in the server 174 (S702). The control device 150 executes the process in S702, thereby constituting part of the current time acquisition unit 806 (see FIG. 6).

Next, the control device 150 records the acquired event occurrence time in the field of the entrance detection time 500 including the ID corresponding to the read individual identification information I in the time recording table T (S704). If the ID corresponding to the read individual identification information I is not recorded in the time recording table T, a new row is added and the ID is also recorded. The control device 150 executes the process in S704, thereby constituting part of the time recording table handling unit 804 (see FIG. 6).

Then, based on the event occurrence time, the control device 150 decides the playback start time corresponding to the event "detection of commodity at entrance" (S706). As will be described later, the "playback start time" is the time at which playback of the continuous image data V to be played back is started when the playback start key EK (to be described later) corresponding to the event is selected. The playback start key EK is arranged on the management screen 400. The control device 150 executes the process in S706, thereby constituting part of the playback start time decision unit 808 (see FIG. 6).

Note that the playback start time may be the same as the event occurrence time at which the event actually has occurred or may be different from the event occurrence time at which the event has occurred. For example, it is possible to set a time few minutes before the event occurrence time as the playback start time. Therefore, for example, it is possible to check the image G slightly before the management target 200, to which the information storage member 110 is attached, passes through the entrance 306. This is common throughout all the events, and therefore will not be repeated below. Also, as described above, in the present embodiment, except for the "lost" event, it is assumed that the event occurrence time is set as the playback start time (playback start time=event occurrence time).

After the control device 150 decides the playback start time corresponding to the event "detection of commodity at entrance", the control device 150 newly displays the event name and the event occurrence time as a "playback start key EK" in the event list EL of the list display section 408 on the management screen 400 displayed on the display device 160 as shown in FIG. 3 (S708). A user can select the fields of "event name" and "event occurrence time" with a pointer, through a touch operation, or the like. In the present embodiment, the event name corresponding to the event is "detection of commodity at entrance"; however, the event name is not limited thereto. Any event name may be used as long as the user can grasp the content of the event. The control device 150 executes the process in S708, thereby constituting part of the management screen display unit 810 (see FIG. 6).

Figure 15:
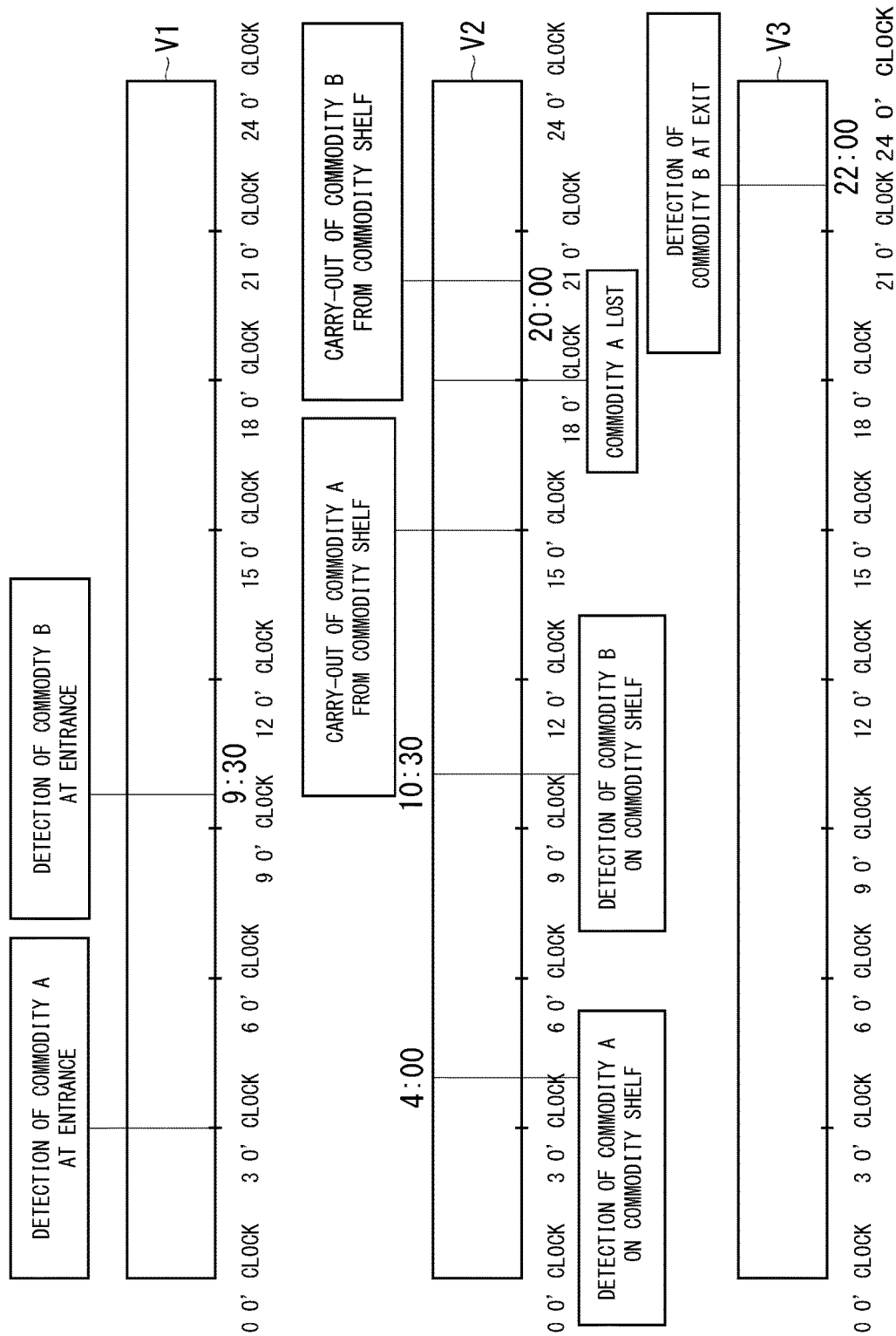
FIG. 15 is a diagram for explaining settings on image data.

Subsequently, returning to FIG. 9, the control device 150 sets the event name and the playback start time in the continuous image data V1 from the camera 132 that continuously captures images of the entrance 306 (S710). For example, in the present embodiment, as shown in FIG. 15, the playback start time of an event "detection of commodity A at entrance" is set at 3:00 of the continuous image data V1. The control device 150 executes the process in S710, thereby constituting part of the time setting unit 812 (see FIG. 6).

The method for setting the playback start time in the continuous image data V1 is not limited to a specific means. For example, a correspondence table (not shown) between the event name or the event occurrence time and the playback start time may be separately created. When a "playback start key EK" is selected on the management screen 400, the control device 150 may grasp the playback start time corresponding to the event name or the like from the correspondence table (not shown) and may play back the continuous image data V1 from the playback start time. In addition, a "tag (trigger)" may be embedded at a location corresponding to the playback start time in the continuous image data V1. This also applies to other events, and therefore will not be repeated below.

When the playback start time has been set in the continuous image data V1, the entrance detection processing routine (S700) is terminated. Returning to FIG. 7, the control device 150 again determines whether or not the entrance-side second information reading unit 126 provided near the entrance 306 has read the individual identification information I from the information storage member 110 (S600).

If the entrance-side second information reading unit 126 has not read the individual identification information I (when the determination is NO in S600), the control device 150 determines whether or not the exit-side second information reading unit 128 provided near the exit 308 has read the specific individual identification information I from the information storage member 110 (S604). The control device 150 executes the process in S604, thereby constituting part of the individual identification information receiving unit 800 (see FIG. 6).

If the exit-side second information reading unit 128 has read the specific individual identification information I (when the determination is YES in S604), the control device 150 refers to the time recording table T, and determines whether or not the time has already been recorded in the field of the exit detection time 506 in the row including the ID corresponding to the specific individual identification information I (S606). The control device 150 executes the process in S606, thereby constituting part of the time recording table handling unit 804 (see FIG. 6).

If the time has already been recorded in the field of the exit detection time 506 (when the determination is YES in S606), the control device 150 again determines whether or not the entrance-side second information reading unit 126 provided near the entrance 306 has read the individual identification information I from the information storage member 110 (S600).

If the time has not yet been recorded in the field of the exit detection time 506 (when the determination is NO in S606), the control device 150 determines that an event "detection of commodity at exit" has occurred based on the fact that the exit-side second information reading unit 128 has read the specific individual identification information I, and executes an exit detection process routine (S740). As shown in FIG. 11, in the exit detection process routine (S740), the control device 150 first acquires the current time as the event occurrence time from the clock 178 (S702). The control device 150 executes the process in S702, thereby constituting part of the current time acquisition unit 806 (see FIG. 6).

Next, the control device 150 records the acquired event occurrence time in the field of the exit detection time 506 in the row including the ID corresponding to the read individual identification information I in the time recording table T (S744). The control device 150 executes the process in S744, thereby constituting part of the time recording table handling unit 804 (see FIG. 6).

Then, based on the event occurrence time, the control device 150 decides the playback start time corresponding to the event "detection of commodity at exit" (S746). The control device 150 executes the process in S746, thereby constituting part of the playback start time decision unit 808 (see FIG. 6).

After the control device 150 decides the playback start time corresponding to the event "detection of commodity at exit", the control device 150 newly displays the event name and the event occurrence time as a "playback start key EK" in the event list EL of the list display section 408 on the management screen 400 displayed on the display device 160 as shown in FIG. 3 (S748). The control device 150 executes the process in S748, thereby constituting part of the management screen display unit 810 (see FIG. 6).

Subsequently, returning to FIG. 11, the control device 150 sets the playback start time associated with the "playback start key EK" in the continuous image data V3 from the camera 136 which continuously captures images of the exit 308 (S750). For example, in the present embodiment, as shown in FIG. 15, the playback start time of an event "detection of commodity B at exit" is set at 22:00 in the continuous image data V3. The control device 150 executes the process in S750, thereby constituting part of the time setting unit 812 (see FIG. 6).

When the playback start time has been set in the continuous image data V3, the exit detection process routine (S740) is terminated. Returning to FIG. 7, the control device 150 again determines whether or not the entrance-side second information reading unit 126 provided near the entrance 306 has read the individual identification information I from the information storage member 110 (S600).

If the exit-side second information reading unit 128 has not read the specific individual identification information I (when the determination is NO in S604), the control device 150 then determines whether or not the first information reading unit 122 provided at the management location 302, that is, the commodity shelf has read the individual identification information I from the information storage member 110 (S608). Specifically the control device 150 determines whether or not the first information reading unit 122 has sent the individual identification information I to the control device 150 via the network device 170 and the communication means 176 of the server 174. The control device 150 executes the process in S608, thereby constituting part of the individual identification information receiving unit 800 (see FIG. 6).

If it is determined that the specific individual identification information I has been read (when the determination is YES in S608) when the control device 150 determines whether or not the first information reading unit 122 has read the individual identification information I from the information storage member 110 (S608), the control device 150 refers to the time recording table T and determines whether or not the time has already been recorded in the field of the commodity shelf carry-in time 502 corresponding to the specific individual identification information I (S610). The control device 150 executes the process in S610, thereby constituting part of the time recording table handling unit 804 (see FIG. 6).

If the time has already been recorded in the field of the commodity shelf carry-in time 502 (when the determination is YES in S610), the control device 150 again determines whether or not the entrance-side second information reading unit 126 provided near the entrance 306 has read the individual identification information I from the information storage member 110 (S600).

In contrast, if the time has not yet been recorded in the field of the commodity shelf carry-in time 502 (when the determination is NO in S610), the control device 150 determines that an event "detection of commodity on commodity shelf" has occurred based on the fact that the first information reading unit 122 has read the individual identification information I, and executes a commodity shelf detection process routine (S720). As shown in FIG. 10, in the commodity shelf detection process routine (S720), the control device 150 first acquires the current time as the event occurrence time from the clock 178 (S722). The control device 150 executes the process in S722, thereby constituting part of the current time acquisition unit 806 (see FIG. 6).

Next, the control device 150 records the acquired event occurrence time in the field of the commodity shelf carry-in time 502 in the row including the ID corresponding to the read individual identification information I in the time recording table T (S724). The control device 150 executes the process in S724, thereby constituting part of the time recording table handling unit 804 (see FIG. 6).

Then, based on the event occurrence time, the control device 150 decides the playback start time corresponding to the event "detection of commodity on commodity shelf" (S726). The control device 150 executes the process in S726, thereby constituting part of the playback start time decision unit 808 (see FIG. 6).

After the control device 150 decides the playback start time corresponding to the event "detection of commodity on commodity shelf", the control device 150 causes the event name and the event occurrence time to be newly displayed as the "playback start key EK", in the event list EL of the list display section 408 on the management screen 400 displayed on the display device 160 as shown in FIG. 3 (S728). The control device 150 executes the process in S728, thereby constituting part of the management screen display unit 810 (see FIG. 6).

Subsequently, returning to FIG. 10, the control device 150 sets the playback start time associated with the "playback start key EK" in the continuous image data V2 from the camera 134 which continuously captures the image of the management area (commodity shelf) 302 (S730). For example, in the present embodiment, as shown in FIG. 15, the playback start time of the event "detection of commodity A on commodity shelf" is set at 4:00 in the continuous image data V2. The control device 150 executes the process in S730, thereby constituting part of the time setting unit 812 (see FIG. 6).

When the playback start time has been set in the continuous image data V2, the commodity shelf detection process routine (S720) is terminated. Returning to FIG. 7, the control device 150 again determines whether or not the entrance-side second information reading unit 126 provided near the entrance 306 has read the individual identification information I from the information storage member 110 (S600).

If it is determined that the specific individual identification information I has not been read (when the determination is NO in S608) when the control device 150 determines whether or not the first information reading unit 122 has read the individual identification information I from the information storage member 110 (S608), the control device 150 refers to the time recording table T and determines whether or not the event occurrence time has already been recorded in the field of the commodity shelf carry-in time 502 corresponding to the specific individual identification information I (S612). The control device 150 executes the process in S612, thereby constituting part of the time recording table handling unit 804 (see FIG. 6).

If the event occurrence time has not yet been recorded in the field of the commodity shelf carry-in time 502 (when the determination is NO in S612), the control device 150 again determines whether or not the entrance-side second information reading unit 126 provided near the entrance 306 has read the individual identification information I from the information storage member 110 (S600).

If the event occurrence time has already been recorded in the field of the commodity shelf carry-in time 502 (when the determination is YES in S612), the control device 150 further refers to the time recording table T, and determines whether or not the event occurrence time has already been recorded in the field of the commodity shelf carry-out time 504 corresponding to the specific individual identification information I (S614). The control device 150 executes the process in S614, thereby constituting part of the time recording table handling unit 804 (see FIG. 6).

If the event occurrence time has not yet been recorded in the field of the commodity shelf carry-out time 504 (when the determination is NO in S614), the control device 150 determines that the event "carry-out of commodity from commodity shelf" has occurred based on the fact that the specific individual identification information I can no longer be read in the management area (commodity shelf) 302, and executes a commodity shelf carry-out process routine (S760). As shown in FIG. 12, in the commodity shelf carry-out process routine (S760), the control device 150 first acquires the current time as the event occurrence time from the clock 178 (S762). The control device 150 executes the process in S762, thereby constituting part of the current time acquisition unit 806 (see FIG. 6).

Next, the control device 150 records the event occurrence time in the field of the commodity shelf carry-out time 504 in the row including the ID corresponding to the read individual identification information I in the time recording table T (S764). The control device 150 executes the process in S764, thereby constituting part of the time recording table handling unit 804 (see FIG. 6).

Then, based on the event occurrence time, the control device 150 decides the playback start time corresponding to the event "carry-out of commodity from commodity shelf" (S766). The control device 150 executes the process in S766, thereby constituting part of the playback start time decision unit 808 (see FIG. 6).

After the control device 150 decides the playback start time corresponding to the event "carry-out of commodity from commodity shelf", the control device 150 newly displays the event name and the event occurrence time as a "playback start key EK" in the event list EL of the list display section 408 on the management screen 400 displayed on the display device 160 (S768) as shown in FIG. 3. The control device 150 executing the process in S768, thereby constituting part of the management screen display unit 810 (see FIG. 6).

Subsequently, returning to FIG. 12, the control device 150 sets the playback start time associated with the "playback start key EK" in the continuous image data V2 from the camera 134 which continuously captures the image of the management area (commodity shelf) 302 (S770). For example, in the present embodiment, as shown in FIG. 15, the playback start time of the event "carry-out of commodity A from commodity shelf" is set at 15:00 in the continuous image data V2. The control device 150 executes the process in S770, thereby constituting part of the time setting unit 812 (see FIG. 6).

When the playback start time has been set in the continuous image data V2, the commodity shelf carry-out process routine (S760) is terminated. Returning to FIG. 7, the control device 150 again determines whether or not the entrance-side second information reading unit 126 provided near the entrance 306 has read the individual identification information I from the information storage member 110 (S600).

If the time has already been recorded in the field of the commodity shelf carry-out time 504 (when the determination is YES in S614), the control device 150 compares the current time and the recorded commodity shelf carry-out time 504 with each other, and determines whether or not the interval between the two times is equal to or greater than a predetermined time period as shown in FIG. 8 (S616). The control device 150 executes the process in S616, thereby constituting part of the time recording table handling unit 804 (see FIG. 6).

If the interval between the two times has not reached the predetermined time (when the determination is NO in S616), returning to FIG. 7, the control device 150 again determines whether or not the entrance-side second information reading unit 126 provided near the entrance 306 has read the individual identification information I from the information storage member 110 (S600).

If the interval between the two times is equal to or greater than the predetermined time period (when the determination is YES in S616), the control device 150 refers to the time recording table T and determines whether or not the time has already been entered in the field of the exit detection time 506 corresponding to the ID (S618). The control device 150 executes the process in S618, thereby constituting part of the time recording table handling unit 804 (see FIG. 6).

If the time has already been recorded in the field of the exit detection time 506 (when the determination is YES in S618), returning to FIG. 7, the control device 150 again determines whether or not the entrance-side second information reading unit 126 provided near the entrance 306 reads the individual identification information I from the information storage member 110 (S600).

If the time has not yet been recorded in the field of the exit detection time 506 (when the determination is NO in S618), the control device 150 determines that a "lost" event in which the management target 200 corresponding to the ID is lost has occurred, and executes a lost process routine (S780). The control device 150 executes the process in S780, thereby constituting part of the lost event occurrence determination unit 814 (see FIG. 6).

As shown in FIG. 13, in the lost process routine (S780), the control device 150 first acquires the current time as the event occurrence time from the clock 178 (S782). The control device 150 executes the process in S780, thereby constituting part of the current time acquisition unit 806 (see FIG. 6).

Figure 16:
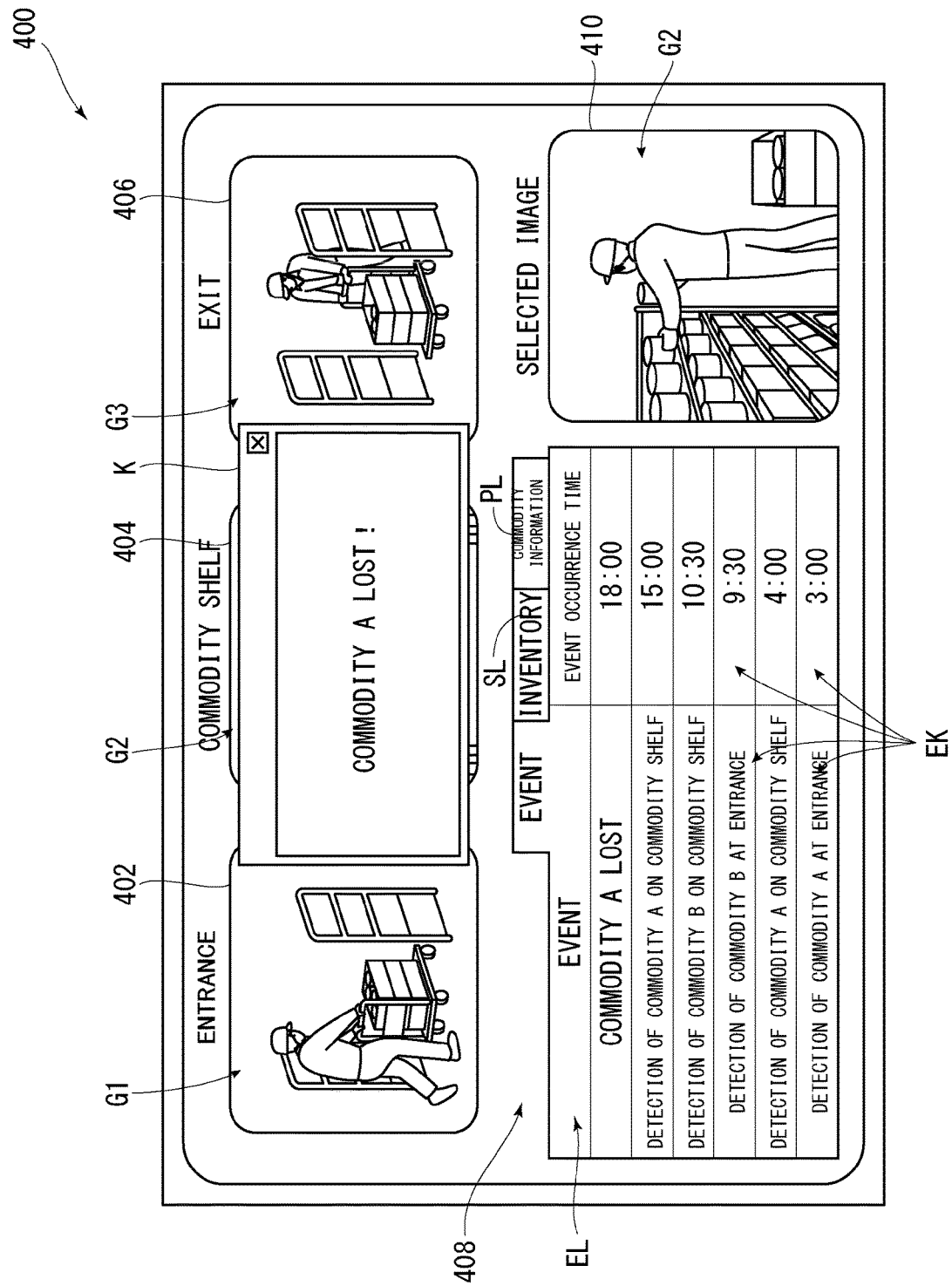
FIG. 16 is a diagram showing an example of the management screen 400.

Then, as shown in FIG. 16, the control device 150 newly displays the event name and the time at which the lost event has occurred on the event list EL of the list display section 408 on the management screen 400 displayed on the display device 160, and displays an alert K (for example, "commodity A lost!"), which indicates the event name in large and conspicuous letters on the management screen 400 (S784). At the same time, the control device 150 plays back and displays the image G2 of the continuous image data V2 on the selected image display section 410 from the playback start time corresponding to the most recent event "carry-out of commodity A from commodity shelf". In the present embodiment, the event name corresponding to the event is set to "lost"; however, the event name is not limited thereto. Any event name may be used as long as the event name enables a user to grasp the content of the event. The control device 150 executes the process in step S784, thereby constituting part of the management screen display unit 810 (see FIG. 6).

Then, the process returns to FIG. 8, and the lost process routine (S780) is terminated. Returning to FIG. 7, the control device 150 again determines whether or not the entrance-side second information reading unit 126 provided near the entrance 306 has read the individual identification information I from the information storage member 110 (S600).

(Playback of Image G Corresponding to Event Desired by User)

When a user selects any one of the playback start keys EK displayed on the management screen 400, the control device 150 plays back the continuous image data V associated with the event corresponding to the selected playback start key EK from the playback start time set in the continuous image data V, and displays the played-back image G on the selected image display section 410 of the management screen 400.

(Example of Commodity Management Using Management System 100 According to Above Embodiment)

Figure 14:
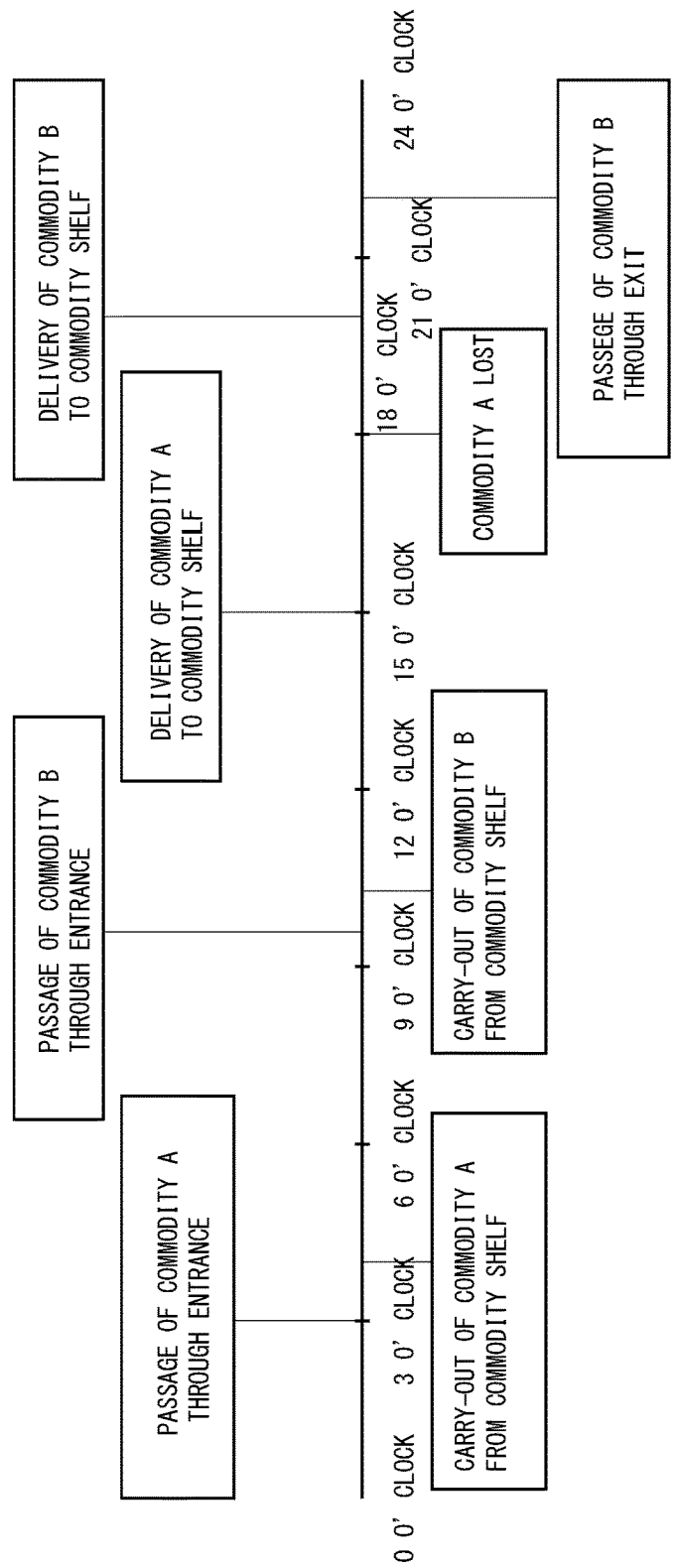
FIG. 14 is a diagram illustrating an example of using the management system 100.

One specific example of commodity management using the management system 100 according to the above embodiment will be described. As shown in FIG. 14, a commodity A passes through the entrance 306 at 3 o'clock, and is delivered to the commodity shelf at 4 o'clock. Then, another commodity B passes through the entrance 306 at 9:30 and is delivered to the commodity shelf at 10:30. After the commodity A is carried out of the commodity shelf at 15 o'clock, a "lost" event occurs with respect to the commodity A at 18 o'clock. After the commodity B is carried out of the commodity shelf at 20 o'clock, the commodity B is carried out through the exit 308 at 22 o'clock. As a premise, as shown in FIGS. 1 and 2, the control device 150 causes the storage device 140 to continuously store via the network device 170 the continuous image data V1, V2, and V3 generated by the three cameras 132, 134, and 136 continuously capturing images of the entrance 306, the commodity shelf (management location 302), and the exit 308, respectively.

(Passage of Commodity A Through Entrance 306)

When the commodity A passes through the entrance 306 at 3 o'clock, the entrance-side second information reading unit 126 of the information reading device 120 provided near the entrance 306 reads the individual identification information I from the information storage member 110 attached to the commodity A (when the determination is YES in S600 of FIG. 7). Then, the control device 150 refers to the time recording table T (see FIG. 5) stored in the storage device 140, and determines that the time is not entered in the field of the entrance detection time 500 in the row of the ID corresponding to the read individual identification information I (when the determination is NO in S602 in FIG. 7). Note that if a field of the ID corresponding to the individual identification information I is not created in the time recording table T, the field of the ID will be created first.

Then, the control device 150 executes the entrance detection process routine S700 (see FIG. 9) to record the entrance detection time (3 o'clock) in the time recording table T (S704), and displays the event name "detection of commodity A at entrance" and the event occurrence time as a "playback start key EK" in the event list EL of the list display section 408 on the management screen 400 (S708: see FIG. 16). Further, as shown in FIG. 9, the control device 150 sets the event name "detection of commodity A at entrance" and the playback start time in the continuous image data V1 of the entrance 306 (S710: see FIG. 15). Therefore, when the "playback start key EK" is selected, the control device 150 plays back and displays the image G1 of the continuous image data V1 on the selected image display section 410 shown in FIG. 3 from the event occurrence time at which the entrance-side second information reading unit 126 reads the individual identification information I, that is, the time at which the commodity A passes through the entrance 306.

(Carry-in of Commodity a to Commodity Shelf for First Time)

When the commodity A is delivered to the commodity shelf at 4 o'clock, the first information reading unit 122 provided near the commodity shelf (management location 302) reads the individual identification information I from the information storage member 110 attached to the commodity A (when the determination is YES in S608 of FIG. 7). Then, the control device 150 refers to the time recording table T stored in the storage device 140 (see FIG. 5), and determines that the time is not entered in the field of the commodity shelf carry-in time 502 in the row of the ID corresponding to the read individual identification information I (when the determination is NO in S610: see FIG. 7).

Then, the control device 150 executes the commodity shelf detection process routine S720 shown in FIG. 10 to record the commodity shelf carry-in time (4 o'clock) in the time recording table T (S724), and to display the event name "detection of commodity A on commodity shelf" and the event occurrence time as a "playback start key EK" in the event list EL (S728: see FIG. 16). Further, the control device 150 sets the event name "detection of commodity A on commodity shelf" and the playback start time in the continuous image data V2 of the commodity shelf (management location 302) (S730: see FIG. 15). As a result, when the "playback start key EK" is selected, the control device 150 plays back and displays the image G2 of the continuous image data V2 on the selected image display section 410 from the event occurrence time at which the first information reading unit 122 reads the individual identification information I, that is, the time at which the commodity A is carried in the commodity shelf (management location 302) (see FIG. 16).

(Passage of Commodity B Through Entrance 306 and Carry-in of Commodity B to Commodity Shelf for First Time)

Similarly to the case of the commodity A, the time at which the commodity B passes through the entrance 306 and the time at which the commodity B is carried in the commodity shelf are recorded in the time recording table T, and each event name and each event occurrence time are displayed in the event list EL. In addition, the event name and the playback start time are set in each of the continuous image data V1 and V2 (see FIGS. 15 and 16).

(Carry-Out of Commodity A from Commodity Shelf)

When the first information reading unit 122 can no longer read the individual identification information I which the first information reading unit 122 has periodically read in the commodity shelf (management location 302) (when the determination is YES in S612 of FIG. 7), the control device 150 refers to the time recording table T stored in the storage device 140, and determines that the time is not entered in the field of the commodity shelf carry-out time 504 in the row of the ID corresponding to the read individual identification information I (when the determination is NO in S614).

Then, the control device 150 executes the commodity shelf carry-out process routine (S760) to record the commodity shelf carry-out time (15 o'clock) in the time recording table T, and as shown in FIG. 16, the event name "carry-out of the commodity A from the commodity shelf" and the event occurrence time are displayed as a "playback start key EK" in the event list EL (S768: see FIG. 3). Further, the control device 150 sets the event name "carry-out of commodity A from commodity shelf" and the playback start time in the continuous image data V2 of the commodity shelf (management location 302) (S770: see FIG. 15). Accordingly, when the "playback start key EK" is selected, the control device 150 plays back and displays the image G2 of the continuous image data V2 on the selected image display section 410 from the event occurrence time at which the first information reading unit 122 no longer reads the individual identification information I, that is, the time at which the commodity A is carried out of the commodity shelf (management location 302) as shown in FIG. 16.

(Occurrence of "Lost Event" with Respect to Commodity A)

Until a predetermined time period has elapsed since it is determined that the commodity A is carried out of the commodity shelf (when the determination is NO in S616 of FIG. 8), the control device 150 does not perform any special operation even if the first information reading unit 122 can no longer read the individual identification information I. In contrast, when the predetermined time period has elapsed (when the determination is YES in S616), the control device 150 refers to the time recording table T stored in the storage device 140, and determines that the time is not entered in the field of the exit detection time 506 in the row of the ID corresponding to the individual identification information I (when the determination is NO in S618).

Then, the control device 150 executes the lost process routine (S780) to display the event name "commodity A lost" and the event occurrence time in the event list EL (S784: see FIG. 16). Further, the control device 150 displays the alert K which indicates the event name "commodity A lost" in large and conspicuous letters on the management screen 400 (S784). At the same time, the control device 150 plays back and displays the image G2 of the continuous image data V2 on the selected image display section 410 from the playback start time corresponding to the most recent event "carry-out of commodity A from commodity shelf".

Note that if the commodity A has passed through the exit 308 before the predetermined time period has elapsed in S616, the exit-side second information reading unit 128 reads the individual identification information I from the information storage member 110 attached to the commodity A, and thus the event occurrence time is recorded in the exit detection time 506 of the time recording table T. Therefore, the determination is NO in S618 and a "lost" event will not occur.

(Passage of Commodity B Through Exit 308 for First Time)

When the commodity B passes through the exit 308 at 22 o'clock, the exit-side second information reading unit 128 provided near the exit 308 reads the individual identification information I from the information storage member 110 attached to the commodity B (when the determination is YES in S604 of FIG. 7). Then, the control device 150 refers to the time recording table T and determines that the time is not entered in the field of the exit detection time 506 in the row of the ID corresponding to the read individual identification information I (when the determination is NO in S606).

Then, the control device 150 executes the exit detection process routine S740 to record the exit detection time (22 o'clock) in the time recording table T (S744: see FIG. 15), and to display the event name "detection of commodity B at exit" and the event occurrence time as a "playback start key EK" in the event list EL (S748: see FIG. 3). Further, as shown in FIG. 15, the control device 150 sets the event name "detection of commodity B at exit" and the playback start time in the continuous image data V3 of the exit 308 (S750). Therefore, when the "playback start key EK" is selected, the control device 150 plays back and displays the image G3 of the continuous image data V3 on the selected image display section 410 from the event occurrence time at which the exit-side second information reading unit 128 reads the individual identification information I, that is, the time at which the commodity B passes through the exit 308.

(Feature 1 of Management System 100)

The management system 100 according to the present embodiment sets the playback start time corresponding to an event that has occurred, in the continuous image data V generated by continuously capturing images of the management location 302 or the like regardless of occurrence of an event. Therefore, the management system according to the present embodiment is simple and requires less storage capacity compared to a conventional management system which creates many pieces of fragmented image data by capturing images of the management location 302 and the like every time an event occurs.

In addition, according to the management system 100, even if the number of events increases, only the number of playback start times set in the image data increases. An increase in data quantity due to an increase in the number of set playback start times is little compared to data quantity of the image data. Therefore, by deciding on specifications such as how many kinds of and how long pieces of image data are stored, it is possible to accurately determine the storage capacity required for the system.

(Feature 2 of Management System 100)

Also, in the management system 100, the "event name" and the "event occurrence time" corresponding to the event that has occurred are displayed on the management screen 400 of the display device 160 as a "playback start key EK", user's selection of the "playback start key EK" is received, and the image G is played back on the display screen from the playback start time corresponding to the selected "playback start key EK". Therefore, a user only needs to select an event in order to play back the continuously captured image G from the time corresponding to the event which the user wishes to check. Therefore, it is possible to easily manage and check the management target 200 such as a commodity.

(Feature 3 of Management System 100)

Further, in the management system 100, images of a plurality of locations such as the management location 302 (for example, a commodity shelf) and the gateway 304 in the management area 300 (for example, a warehouse) are continuously captured by the plurality of cameras 132, 134, and 136, and thus a plurality of pieces of continuous image data V1, V2, and V3 are generated. An "event name" and a "playback start time" are set in each of the continuous image data V1, V2, and V3, and "playback start keys EK" corresponding to the "event names" and the "playback start times" are displayed on the management screen 400. Therefore, it is possible to easily display images of the continuous image data V1, V2, and V3 from which the event selected by the user is most easily grasped.

(Feature 4 of Management System 100)

In addition, in the management system 100, a case where specific individual identification information I can no longer be read at the management location 302 (commodity shelf) (when the determination is NO in S608) is also treated as an event. Therefore, it is possible to play back the image G by detecting the time at which the management target 200 (commodity) is taken out from the management location 302 (commodity shelf) and using the time as the playback start time.

(Feature 5 of Management System 100)

In addition, in the management system 100, the images of the management location 302 and the gateway 304 are continuously captured. Therefore, it is possible to easily check not only a situation where the management target 200 is carried into and out of the management location 302 but also the situation where the management target 200 is carried into and out of the management area 300.

(Feature 6 of Management System 100)

Further, in the management system 100, the gateway 304 is divided into the entrance 306 and the exit 308, and the information reading units 124 and 126 are provided near the entrance 306 and the exit 308, respectively. Therefore, it is possible to provide the management system 100 which can clearly distinguish a management target 200 carried into management area 300 from a management target 200 carried out of management area 300, and which can smoothly carry in and out management targets 200 even when the management system 100 handles management targets 200 which are frequently carried into and out of the management area 300.

(Feature 7 of Management System 100)

Further, in the management system 100, an RFID tag is used as the information storage member 110 which stores individual identification information I. Therefore, the individual identification information I can be automatically read and management efficiency can be enhanced.

(Feature 8 of Management System 100)

Further, in the management system 100, the control device 150 causes the alert K "commodity A lost" to be displayed on the management screen 400, and at the same time, causes the image G2 of the continuous image data V2 to be played back and displayed on the selected image display section 410 from the playback start time corresponding to the latest event "carry-out of commodity A from commodity shelf". A user who comes to know that a "lost" event has occurred normally wishes to check who has taken out the commodity from the commodity shelf. Therefore, according to this modification, a user who comes to know occurrence of a "lost" event can check the image G2 corresponding to the latest event "carry-out of commodity A from commodity shelf" without performing any operation.

(Program Executed by Imaging Device 130)

A program is executed by the imaging device 130. The program includes a step of continuously capturing images of at least an area where the information reading device 120 can read the individual identification information I of the management target 200 stored in the information storage member 110, to generate continuous image data V. A playback start time corresponding to an event occurrence time at which an event related to the individual identification information I has occurred is set in the continuous image data V.

That is, the imaging device 130 continuously captures images of at least an area where the information reading device 120 can read individual identification information I of the management target 200 stored in the information storage member 110, to generate continuous image data V. A playback start time corresponding to an event occurrence time at which an event related to the individual identification information I has occurred is set in the continuous image data V.

Further, in the imaging device 130, a method is executed for continuously capturing images of at least an area where the information reading device 120 can read individual identification information I of the management target 200 stored in the information storage member 110 to generate continuous image data V. A playback start time corresponding to an event occurrence time at which an event related to the individual identification information I has occurred is set in the continuous image data V.

(Program Executed by Control Device 150)

A program is executed in the control device 150 of the server 174. The program including a step of causing the storage device to store continuous image data V obtained by continuously capturing images of at least an area where the information reading device 120 can read individual identification information I of the management target 200 stored in the information storage member 110, a step of acquiring an event occurrence time at which an event related to the individual identification information I has occurred, and a step of setting, in the continuous image data V, a playback start time corresponding to the event occurrence time.

(Program Executed by PC-Side Control Device 152)

A program is executed in the PC-side control device 152 of the PC 172. The program includes a step of causing the display device 160 to display an image based on continuous image data V. The continuous image data V is obtained by continuously capturing images of at least an area where the information reading device 120 can read individual identification information I of the management target 200 stored in the information storage member 110. A playback start time corresponding to an event occurrence time at which an event related to the individual identification information I has occurred is set in the continuous image data V.

(Modification A)

In the above-described embodiment, when a user selects a "playback start key EK" displayed on the management screen 400, the image G of an event corresponding to the "playback start key EK" is played back. Alternatively, the control device 150 may automatically play back the image G, for example, of the event that has occurred most recently, even if a user does not select the "playback start key EK". In addition, a case where the image G of the corresponding event is played back when a user selects a "playback start key EK" and a case where the image G is automatically played back may be combined.

Note that in the above embodiment, the control device 150 causes the alert K "commodity A lost" to be displayed on the management screen 400, and at the same time, causes the image G2 of the continuous image data V2 to be played back and displayed on the selected image display section 410 from the playback start time corresponding to the latest event "carry-out of commodity A from commodity shelf".

However, alternatively, it is possible to only issue the alert "commodity A lost" without automatically playing back the image G2.

(Modification B)

The individual identification information I is not limited to the individual identification information I described in the above embodiment. For example, based on the individual identification information I, the control device 150 may cause the storage device 140 to store the number of information storage members 110, the types of the information storage members 110, the time at which the information reading device 120 first reads the specific individual identification information I or the time at which the information reading device 120 reads the specific individual identification information I last time.

(Modification C)

Figure 2:
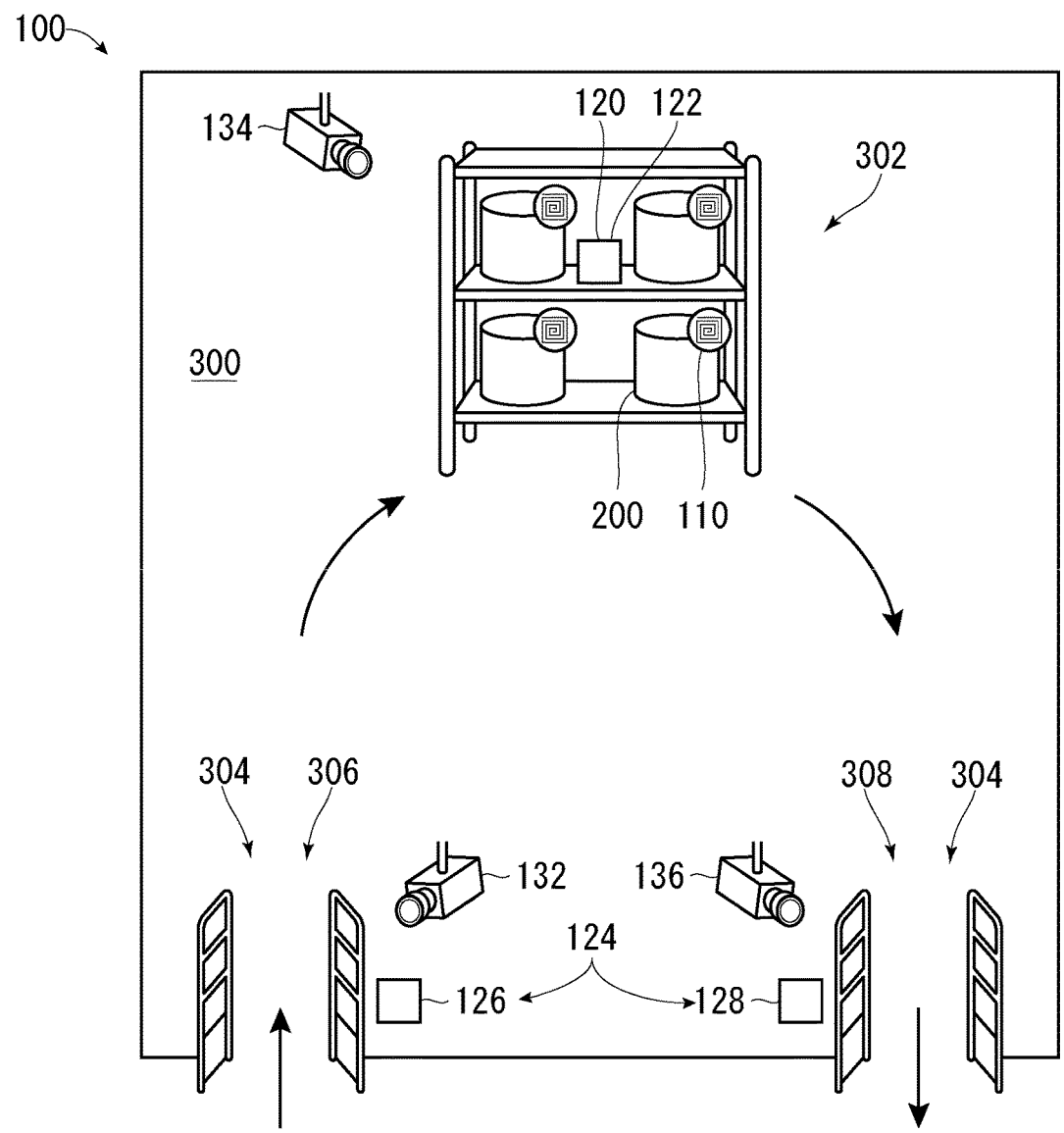
FIG. 2 is a diagram showing an example of a configuration of a management area 300.

In FIG. 2 illustrating the above embodiment, the entrance 306 and the exit 308 are depicted as large-scale "gates"; however, the forms of the entrance 306 and the exit 308 are not limited thereto, and may be a simple entrance and a simple exit where the entrance-side second information reading unit 126 and the exit-side second information reading unit 128 are installed on a path. Further, instead of providing the entrance 306 and the exit 308, a first gateway and a second gateway may be provided through which a management target 200 can be carried in and out, and each of the first gateway and the second gateway is provided with the information reading device 120. Therefore, the management target 200 can be moved more smoothly.

(Modification D)

In the above embodiment, the "event name" and the "event occurrence time" displayed on the management screen 400 are used as the "playback start key EK"; however, instead of or in addition to the above, another "playback start key EK" may be used. Furthermore, the "playback start key EK" need not be provided on the management screen 400. The "playback start key EK" (or a button) may be provided on separately installed hardware.

(Modification E)

In the above embodiment, the three cameras 132, 134, and 136 are used as the imaging device 130, and the three information reading units 122, 124, and 126 are used as the information reading device 120; however, the number of cameras constituting the imaging device 130 and the number of information reading units constituting the information reading device 120 are not limited thereto. For example, as shown in FIG. 17, in the case of a management area 300 which is comparatively small and has one gateway 310, one camera 138 may collectively capture images of both the management location 302 and the gateway 310, and one information reading unit 129 may be installed near the gateway 310.

Figure 17:
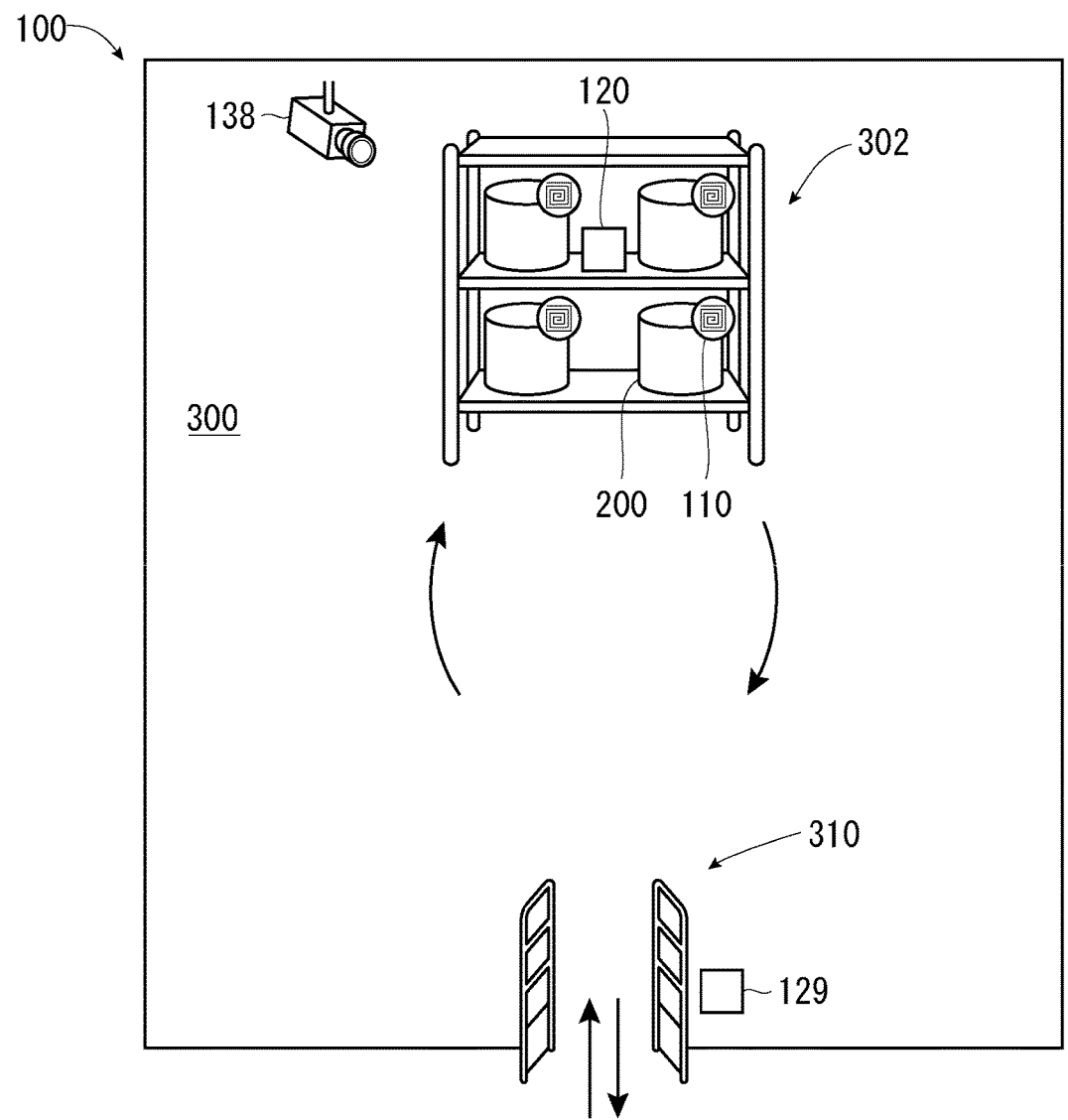
FIG. 17 is a diagram showing another example of the configuration of the management area 300.
Figure 18:
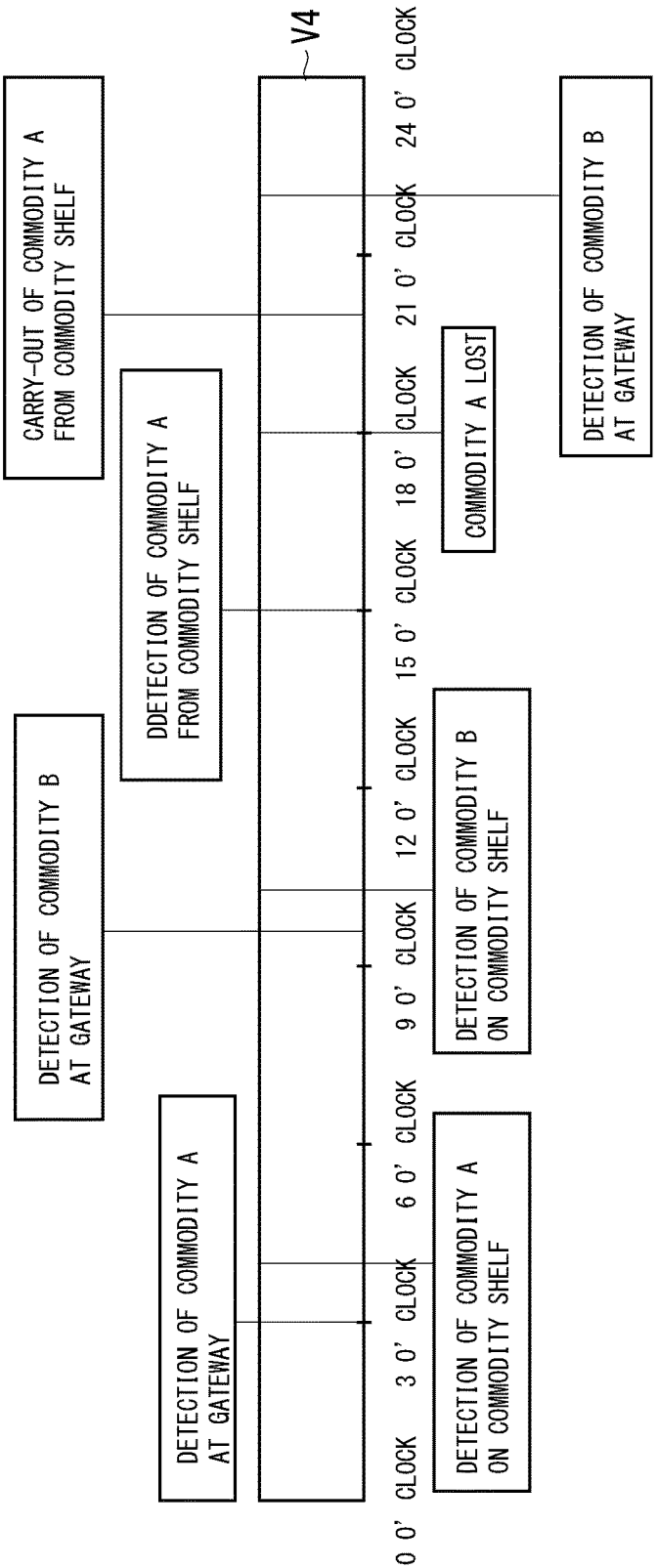
FIG. 18 is a diagram for explaining settings on image data.
Figure 19:
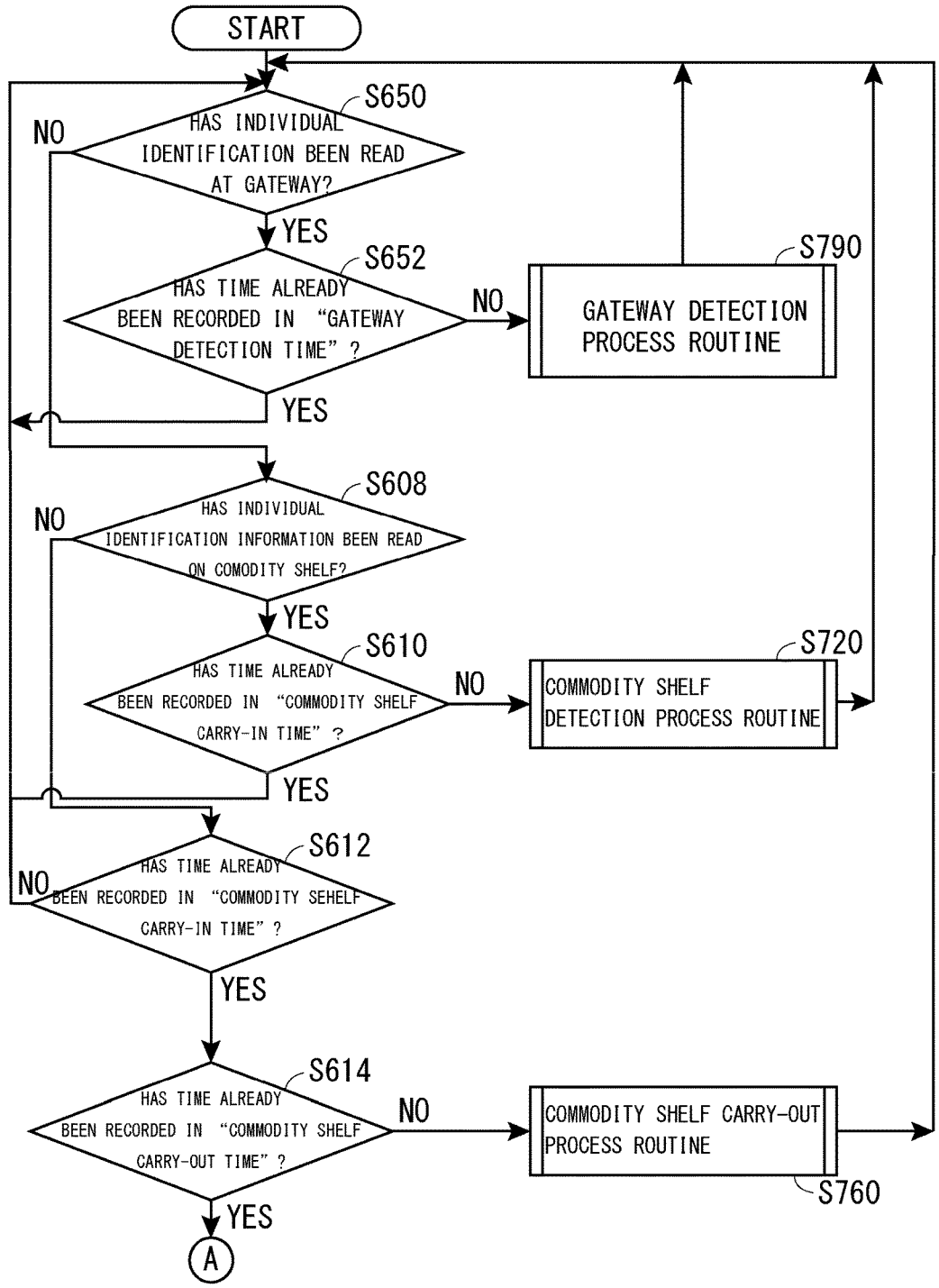
FIG. 19 is a flowchart showing another example of the processes executed by the management system 100.
Figure 20:
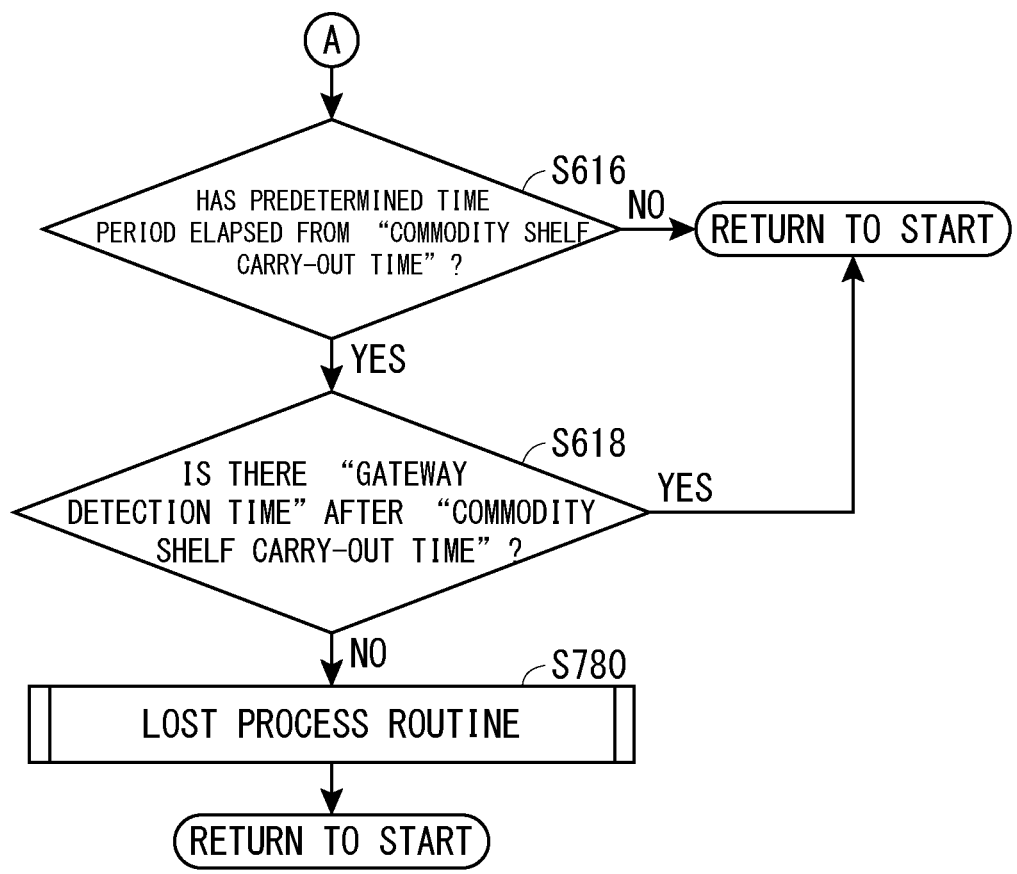
FIG. 20 is a flowchart showing another example of the processes executed by the management system 100.

In the case as shown in FIG. 17, the camera 138 continuously captures images to generate one piece of continuous image data V4. Therefore, the event names and the event occurrence times set in the continuous image data V4 are as shown in FIG. 18. As for the processing flow, as shown in FIGS. 19 and 20, it is first determined "whether or not individual identification information I has been read at the gateway 310" (S650), and if the determination is YES, an event "detection of commodity at gateway" occurs, and a gateway detection process routine S790 for recording the event occurrence time in a gateway detection time 508 of the time recording table T is executed. Note that the gateway detection process routine S790 is basically the same as the entrance detection process routine (S700: see FIG. 9), and the "entrance detection time" is simply changed to the "gateway detection time".

(Modification F)

As described in the above embodiment, the processes of the management system 100 may be performed by the PC-side control device 152 in the PC 172 connected to the network device 170, or may be performed by the control device 150 in the server 174 connected to the network device 170. In addition, the PC-side control device 152 in the PC 172 may perform the processes of the management system 100 by using the storage device 140 in the server 174, or conversely, the control device 150 in the server 174 may perform processes of the management system 100 by using the PC-side storage device 142 in the PC 172. Furthermore, the processes of the management system 100 may be performed by a laptop computer or a tablet connected to the network device 170.

(Modification G)

In the above embodiment, an example in which the management system 100 to which the present invention is applied is used for inventory management has been described; however, application of the management system 100 is not limited to management of such "objects". For example, the management system 100 may be used for managing "people". For example, when the management system 100 is used for entry and exit management, the management area 300 is an office, a factory, or a school, and the management location 302 is a desk, a workplace, or a classroom. In addition, for example, the management system 100 may be configured such that a worker is set as a management target 200, times when the worker passes through a location near the information reading device 120 for the individual identification information I such as the gateway 304 or the like and a place, an image of which can be captured by the imaging device 130, or the like are detected. Thus, the management system 100 manages movement of the worker or the like.

(Modification H)

Alternatively to the above embodiment, the management system 100 can also be applied to an inspection upon receipt or shipment of the management target 200 (for example, an inspection as to the number of management targets 200 or as to whether or not the management target 200 operates without problem). For example, the information reading device 120 is provided near a place where an inspection is performed and the image of the place is captured by a camera. In addition, the information reading device 120 reads individual identification information I of the management target 200 to be received or shipped and an inspection is performed. The timing when the inspection is performed is set as an event occurrence time. As a result, it is possible to check a continuous image from the time point when the inspection is performed for each management target 200 by using the PC 172 and to check whether or not an appropriate inspection is performed.

(Modification I)

In the above embodiment, carry-in, carry-out, lost, and the like of the management target 200 are exemplified as events; however, the events are not limited thereto. For example, an event may be a case where the management target 200 is misplaced or a case where the number of management targets 200 of a specific type becomes less than a certain number, or the like. An event may be set appropriately according to the content of the management system 100, the place where the management system 100 is applied, or the like.

(Modification J)

In addition, it is also possible to cause the display device 160 of the PC 172 to display a notice indicating that the management target 200 is located at a predetermined place such as a shelf after a predetermined time period has elapsed from shipment or receipt of the management target 200. For example, when the management target 200 as a commodity has a disposal deadline or the like, the time elapsed from receipt of the commodity is detected, and a notice is issued after a preset period (a disposal deadline or one month before the disposal deadline) has elapsed. Thus, it is possible to prevent forgetting to discard the commodity.

It should be considered that the embodiments disclosed herein are examples in all respects and not restrictive. The scope of the present invention is defined not by the above description but by the scope of claims, and it is intended that all meanings of the scope of the claims and their equivalents and all modifications within the scope are included.

REFERENCE SIGNS LIST

100: Management system
110: Information storage member
120: Information reading device
122: First information reading unit
124: Second information reading unit
126: Entrance-side second information reading unit
128: Exit-side second information reading unit
129: Information reading unit
130: Imaging device
132, 134, 136, 138: Camera
140: Storage device
142: PC-side storage device
150: Control device
152: PC-side control device
160: Display device
170: Network device
172: PC
174: Server
176: Communication means
177: PC-side communication means
178: Clock
179: PC-side clock
200: Management target
300: Management area
302: Management location
304: Gateway
306: Entrance
308: Exit
310: Gateway
400: Management screen
402, 404, 406: Camera image display section
408: List display section
410: Selected image display section
500: Entrance detection time
502: Commodity shelf carry-in time
504: Commodity shelf carry-out time
506: Exit detection time
508: Gateway detection time
800: Individual identification information receiving unit
802: Continuous image data receiving unit
804: Time recording table handling unit
806: Current time acquisition unit
808: Playback start time decision unit
810: Management screen display unit
812: Time setting unit
814: Lost event occurrence determination unit I: Individual identification information (possessed by information storage member)
V: Continuous image data
G: Image
EL: Event list
SL: Inventory list
PL: Commodity information list
T: Time recording table
K: Alert
EK: Playback start key

The invention claimed is:

1. A management system comprising:
an information storage member that stores individual identification information of a management target;
an information reading device that reads the individual identification information from the information storage member when the information storage member is located within a predetermined area proximate the information reading device, wherein the predetermined area covers an entire area in which the information reading device reads the individual identification information;
an imaging device that generates continuous image data by continuously capturing images of at least an entirety of the predetermined area;
a storage device that stores the continuous image data;
a control device that acquires an event occurrence time at which an event related to the individual identification information read by the information reading device has occurred, and embeds a tag of a playback start time corresponding to the event occurrence time in the continuous image data to configure setting; and
a display device capable of displaying an image based on the continuous image data.

2. The management system according to claim 1, wherein the control device causes the display device to display a playback start key corresponding to the event, accepts selection of the playback start key, and causes the display device to play back the image based on the continuous image data from the playback start time corresponding to the selected playback start key.

3. The management system according to claim 1, wherein the imaging device includes a plurality of cameras, and a plurality of pieces of the continuous image data captured by the plurality of cameras are stored in the storage device.

4. The management system according to claim 1, wherein based on the individual identification information, the control device causes the storage device to store at least one of a number of the information storage members, a type of the information storage members, a time at which the information reading device first reads the individual identification information, and a time at which the information reading device reads the individual identification information last time.

5. The management system according to claim 1, wherein the event includes a case where the information reading device reads specific individual identification information.

6. The management system according to claim 1, wherein the event includes a case where the information reading device that has read specific individual identification information can no longer read the individual identification information which is identical to the specific individual identification information.

7. The management system according to claim 1, wherein the information storage member is attached to the management target managed in a management area,
the management area includes:
a management location set in the management area; and
a gateway through which the management target carried into and out of the management area passes, and
the imaging device continuously captures images of the management area and the gateway.

8. The management system according to claim 7, wherein the information reading device includes:
a first information reading unit that reads the individual identification information from the information storage member located at the management location; and
a second information reading unit that reads the individual identification information from the information storage member located at the gateway, and
the event includes a case where, after each of the first information reading unit and the second information reading unit reads specific individual identification information, each of the first information reading unit and the second information reading unit no longer reads the specific individual identification information for a predetermined time period or longer.

9. The management system according to claim 7, wherein the gateway includes an entrance through which the management target carried into the management area passes, and an exit through which the management target carried out of the management area passes, the exit being provided separately from the entrance, and
the entrance and the exit are individually provided with the information reading device.

10. The management system according to claim 7, wherein
the gateway includes a first gateway through which the management target carried into and out of the management area passes, and a second gateway through which the management target carried into and out of the management area passes, the second gateway being provided separately from the first gateway, and
the first gateway and the second gateway are individually provided with the information reading device.

11. The management system according to claim 1, wherein
the information storage member is an RFID tag, and
the information reading device is an RFID reader.

12. A server comprising:
a storage device that stores:
continuous image data obtained by continuously capturing images of at least an entirety of a predetermined area in which an information reading device reads individual identification information of a management target stored in an information storage member; and
an event occurrence time at which an event related to the individual identification information has occurred, wherein
a playback start time corresponding to the event occurrence time is set in the continuous image data by embedding a tag in the continuous image data; and
a control device that provides a portion of the continuous image data starting at the playback start time, in response to a selection of a predetermined option associated with the playback start time.

13. A management device comprising:
a storage device that stores continuous image data of at least an entirety of a predetermined area obtained by continuously capturing images of at least the predetermined area, the predetermined area corresponding to an entire area in which an information reading device reads individual identification information associated with a management target, wherein a tag of a playback start time is embedded in the continuous image data, the playback start time corresponding to an event occurrence time at which an event related to the individual identification information has occurred;

a display device; and a control device that causes the display device to display a portion of the continuous image data based on the playback start time.

14. A management method using the management system of claim 1, comprising the steps of:

storing, in the storage device, continuous image data obtained by continuously capturing images of at least an entirety of the predetermined area in which the information reading device reads individual identification information of a management target stored in the information storage member;

acquiring the event occurrence time at which an event related to the individual identification information has occurred;

embedding the tag of a playback start time corresponding to the event occurrence time in the continuous image data; and causing the display device to display a portion of the continuous image data based on the playback start time.

* * * * *